(12) United States Patent
Lu et al.

(10) Patent No.: US 11,432,326 B2
(45) Date of Patent: Aug. 30, 2022

(54) MULTI-LINK CHANNEL ACCESS AND OPERATION WITH EFFICIENT UTILIZATION OF MULTI-LINK RESOURCES

(71) Applicant: MediaTek Singapore Pte. Ltd., Singapore (SG)

(72) Inventors: Kaiying Lu, San Jose, CA (US); James Chih-Shi Yee, San Jose, CA (US); Yongho Seok, San Jose, CA (US); Chao-Chun Wang, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 50 days.

(21) Appl. No.: 17/072,027

(22) Filed: Oct. 15, 2020

(65) Prior Publication Data

US 2021/0127420 A1 Apr. 29, 2021

Related U.S. Application Data

(60) Provisional application No. 62/927,176, filed on Oct. 29, 2019.

(51) Int. Cl.
*H04W 74/08* (2009.01)
*H04W 76/15* (2018.01)
*H04W 84/12* (2009.01)

(52) U.S. Cl.
CPC ....... *H04W 74/0808* (2013.01); *H04W 76/15* (2018.02); *H04W 84/12* (2013.01)

(58) Field of Classification Search
CPC . H04W 74/0808; H04W 76/15; H04W 84/12; H04W 56/00; H04W 56/002; H04W 74/08; H04W 74/0816; H04W 74/085
See application file for complete search history.

(56) References Cited

U.S. PATENT DOCUMENTS

| 2019/0090278 A1* | 3/2019 | Chu .................... H04L 5/1461 |
| 2019/0150214 A1* | 5/2019 | Zhou ................... H04L 1/1621 |
| | | 370/329 |
| 2021/0014811 A1* | 1/2021 | Seok ................... H04W 76/15 |
| 2021/0068184 A1* | 3/2021 | Chu ................. H04W 74/0808 |
| 2021/0076413 A1* | 3/2021 | Lu ....................... H04W 76/15 |

OTHER PUBLICATIONS

LG electronics, Channel Access for Multi-link Operation, IEEE 802.11-19/1144r6, Date Jul. 2019. Slides 1-14.*

* cited by examiner

*Primary Examiner* — Ahmed Elallam
(74) *Attorney, Agent, or Firm* — Han IP PLLC; Andy M. Han

(57) ABSTRACT

An apparatus capable of multi-link operations with respect to a first link and a second link obtains a second transmission opportunity (TXOP) on the second link after one other apparatus has started a first TXOP on the first link. The apparatus performs one or more transmissions during the second TXOP on the second link such that the second TXOP is at least partially synchronized with the first TXOP on the first link.

20 Claims, 16 Drawing Sheets

1500

OBTAIN, BY AN APPARATUS CAPABLE OF MULTI-LINK OPERATIONS WITH RESPECT TO A FIRST LINK AND A SECOND LINK, A SECOND TRANSMISSION OPPORTUNITY (TXOP) ON THE SECOND LINK AFTER ONE OTHER APPARATUS HAS STARTED A FIRST TXOP ON THE FIRST LINK
1510

PERFORM, BY THE APPARATUS, ONE OR MORE TRANSMISSIONS DURING THE SECOND TXOP ON THE SECOND LINK SUCH THAT THE SECOND TXOP IS AT LEAST PARTIALLY SYNCHRONIZED WITH THE FIRST TXOP ON THE FIRST LINK
1520

FIG. 15

MULTI-LINK CHANNEL ACCESS AND OPERATION WITH EFFICIENT UTILIZATION OF MULTI-LINK RESOURCES

CROSS REFERENCE TO RELATED PATENT APPLICATION

The present disclosure is part of a non-provisional patent application claiming the priority benefit of U.S. Provisional Patent Application No. 62/927,176, filed 29 Oct. 2019, the content of which being incorporated by reference in its entirety.

TECHNICAL FIELD

The present disclosure is generally related to wireless communications and, more particularly, to multi-link channel access and operation with efficient utilization of multi-link resources.

BACKGROUND

Unless otherwise indicated herein, approaches described in this section are not prior art to the claims listed below and are not admitted as prior art by inclusion in this section.

In wireless local area network (WLANs) in accordance with next-generation Institute of Electrical and Electronics Engineers (IEEE) 802.11 standards (e.g., IEEE 802.11be), multi-link operation is intended to provide services meeting extremely low latency and extremely high throughput requirements. Stations (STAs) capable of multi-link transmission would be able to access any of multiple links upon such link(s) becoming available. However, in an event that an access point (AP) capable of multi-link operation has constraints on receiving and transmitting frames simultaneously on the multiple links due to in-device coexistence (IDC) interference (e.g., between the 5 GHz and 6 GHz frequency bands), the multiple links might not be utilized efficiently because of the IDS interference. For instance, when a STA has frame exchange with a multi-link AP on a first link of multiple links in an ongoing transmission opportunity (TXOP), in case another associated STA obtains a new TXOP on a second link of multiple links which would cause IDC interference with the first link, then there would be interference between the ongoing TXOP on the first link and the new TXOP on the second link to result in reduced total throughput. In case the ongoing TXOP is for a low-latency traffic, then the low-latency traffic would be negatively impacted due to higher error rate.

One conservative method to avoid the IDC interference issue might involve forcing STAs that detect frame exchanges from its own basic service set (BSS) on one link to suspend backoff or to perform internal collision resolution on another link till an ongoing TXOP on the one link is over. In some cases, such STAs could be hidden from each other on different links and, thus, it would be even more difficult to avoid the IDC interference issue. Therefore, there is a need for a solution to efficiently utilize multi-link resources with restriction on simultaneous transmission and reception.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to multi-link channel access and operation with efficient utilization of multi-link resources.

In one aspect, a method may involve an apparatus, capable of multi-link operations with respect to a first link and a second link, obtaining a second TXOP on the second link after one other apparatus has started a first TXOP on the first link. The method may also involve the apparatus performing one or more transmissions during the second TXOP on the second link such that the second TXOP is at least partially synchronized with the first TXOP on the first link.

In another aspect, a method may involve an apparatus, capable of multi-link operations with respect to a first link and a second link, obtaining a first TXOP on the first link. The method may also involve the apparatus performing one or more transmissions during the first TXOP on the first link such that the first TXOP is at least partially synchronized with a second TXOP obtained by one other apparatus on the second link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 15 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multi-link channel access and operation with efficient utilization of multi-link resources in wireless communications. According to the present disclosure, a number of possible solutions may be implemented separately or jointly. That is, although these possible solutions may be described below separately, two or more of these possible solutions may be implemented in one combination or another.

Figure 1:
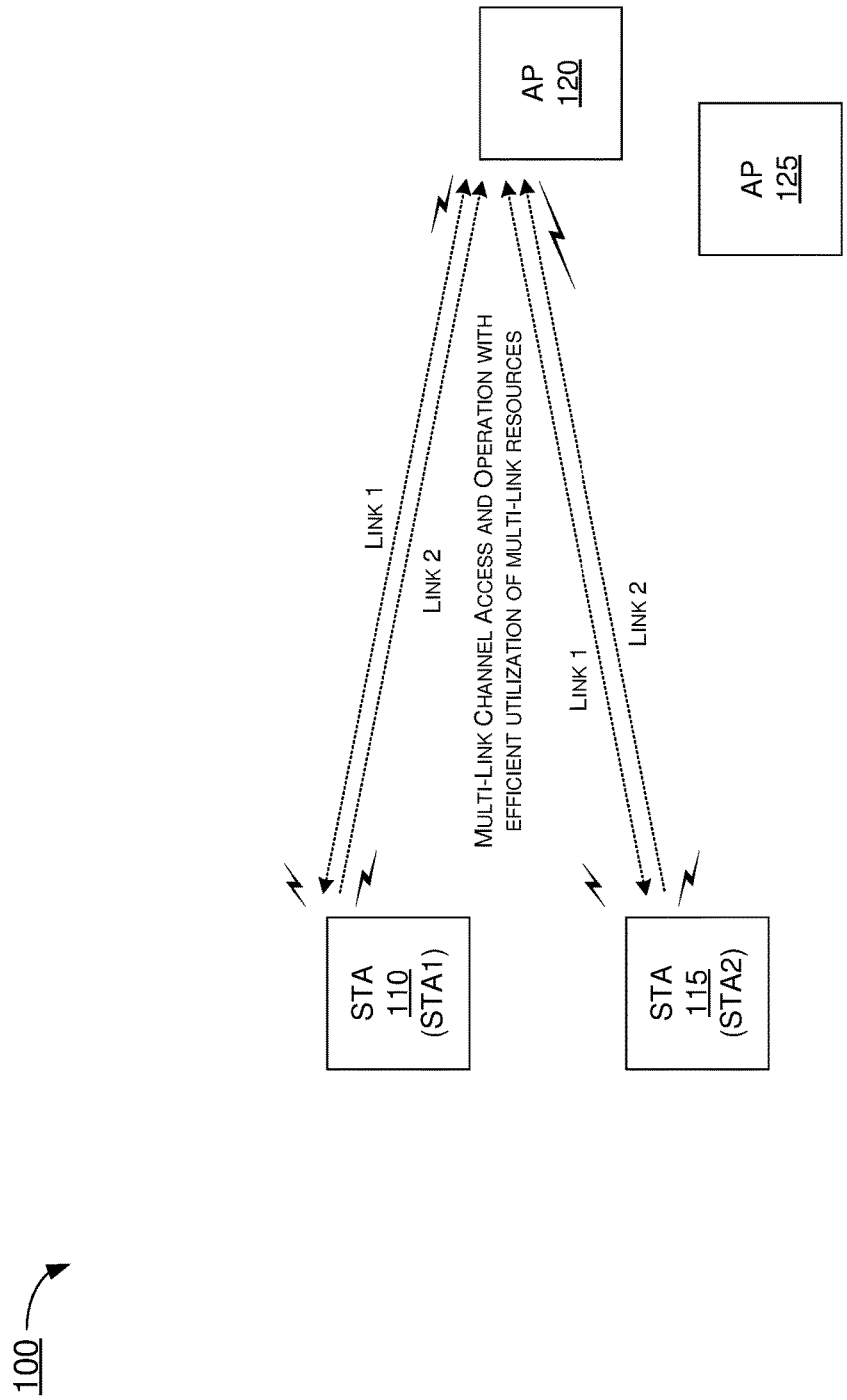
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 13 illustrate examples of implementation of various proposed schemes in network environment 100 in accordance with the present disclosure. The following description of various proposed schemes is provided with reference to FIG. 1~FIG. 13.

Referring to FIG. 1, network environment 100 may involve at least a STA 110 and a STA 115 that are associated with, and communicating wirelessly with, an AP 120 in accordance with one or more IEEE 802.11 standards. Each of STA 110 (herein interchangeably referred to and denoted as "STA1") and STA 115 (herein interchangeably referred to and denoted as "STA2") may be a multi-link STA with one or more links (e.g., link 1 and link 2) operating in, for example and without limitation, the 2.4 GHz band, 5 GHz-band and/or 6 GHz band. Similarly, AP 120 may be multi-link capable and thus may communicate with STA 110 and/or STA 115 over one or more links (e.g., link 1 and link 2). Under various proposed schemes in accordance with the present disclosure, STA 110, STA 115 and AP 120 may be configured to perform multi-link channel access and operation with efficient utilization of multi-link resources in accordance with various proposed schemes described below.

In various proposed schemes described below, AP 120, as a multi-link device management entity, may up multiple links (e.g., link 1 and link 2). All uplink (UL) traffic from associated STAs (e.g., STA 110 and STA 115) on all enabled links may be configured as either contention-based channel access or trigger-based channel access, or both. Each multi-link device may be capable of simultaneous multi-link operation with each link corresponding to one AP. Moreover, multiple multi-link APs (e.g., AP 120 and AP 125) may be co-located or non-co-located. When co-located, the multi-link APs may or may not support simultaneous transmitting/receiving (TX/RX) which means simultaneous transmitting on one link and receiving on the other link. The associated non-AP STAs may be capable of either single-link or multi-link operation. For example, each of STA 110 and STA 115, as a non-AP STA, may be capable of multi-link with switching, multi-link with support of simultaneous TX/RX (or asynchronous transmissions), and/or multi-link with no support of simultaneous TX/RX (or synchronous transmissions). Moreover, multi-link APs, such as AP 120 and AP 125, may synchronize multiple TXOPs from different TXOP holders on a pair of links with no support of simultaneous TX/RX. For instance, associated non-AP STAs of a multi-link AP may independently contend for medium and obtain TXOP(s) on a pair of links which may be partially overlapped in time. Additionally, the TXOPs obtained by different TXOP holders on the pair of links may be partially overlapped in time.

Under a proposed scheme in accordance with the present disclosure, in support of controlled multi-link channel access and operation, a multi-link device (e.g., AP 120) may synchronize two TXOPs obtained by different TXOP holders (e.g., STA 110, STA 115 and/or AP 120) on a pair of links (e.g., link 1 and link 2). Under the proposed scheme, a TXOP initiator (e.g., STA 1110, STA 115 or AP 120) may obtain a TXOP on one link of the pair of links by using a contention-based channel access mechanism. Moreover, the TXOP initiator may obtain a TXOP on one link (e.g., link 2 or a secondary link (S-Link)) based on a TXOP on the other link (e.g., link 1 or a primary link (P-Link)) to align the transmissions on those links by using at least one of the following channel access schemes: contention-based channel access mechanism (e.g., enhanced distributed channel access (EDCA)), virtual carrier sensing (CS) (or network allocation vector (NAV)), and energy detection (ED)-based clear channel assessment (CCA) (ED-based CCA) based on energy detected being higher than a threshold (e.g., −62 dBm or −72 dBm or another value).

Under a proposed scheme in accordance with the present disclosure, each multi-link device (e.g., STA 110, STA 115 and AT 120) may function as a TXOP responder of the TXOPs on a pair of links, respectively. Alternatively, each multi-link device may function as a TXOP responder on one link and as a TXOP initiator on the other link. Under the proposed scheme, the multi-link device may, as a TXOP responder on one link and a TXOP initiator on the other link, synchronize its associated TXOP (initiated by the multi-link device) with the other TXOP (for which the multi-link device is a responder) by controlling a length of subsequent frame exchanges of its associated TXOP to align with the uplink transmission and downlink transmission on the pair of links within an overlapped TXOP duration.

Under a proposed scheme in accordance with the present disclosure, a short feedback packet (e.g., a null data packet (NDP) acknowledgement (ACK)) without higher-layer payload information may be used by a TXOP initiator, instead of normal block acknowledgement (BlockAck or BA), to control a feedback type (e.g., ACK or delayed ACK) and a length of the subsequent frame exchanges of its associated TXOP to align with the uplink/downlink transmissions on two links or with minimum overlapping of uplink and downlink transmission time within the overlapped TXOP duration. Under the proposed scheme, the short feedback packet may also be used to terminate the TXOP by indicating a next transmission length as 0.

Figure 2:
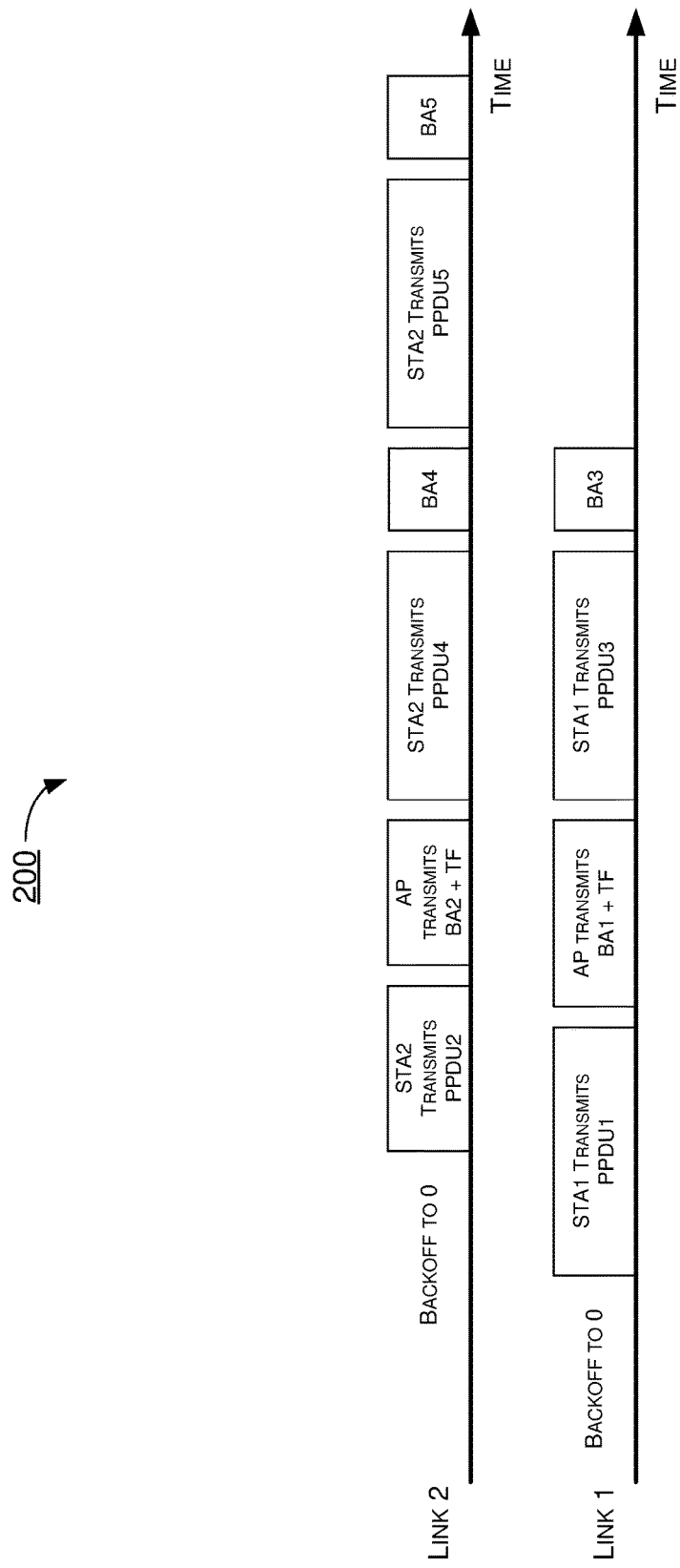
FIG. 2 is a diagram of an example scenario in accordance with the present disclosure.

FIG. 2 illustrates an example scenario 200 of controlled multi-link channel access and operation in accordance with the present disclosure. In scenario 200, both STA1 and STA2 may be associated with a co-located multi-link AP set. STA1 may obtain a TXOP using enhanced distributed channel access (EDCA) on link 1 when a backoff timer of STA1 counts down to 0. STA2 may obtain a TXOP using EDCA on link 2 when a backoff timer of STA2 counts down to 0. The co-located multi-link APs may transmit a joint trigger (e.g., trigger frame or TF) aggregated with a BA (e.g., shown as BA1+TF and BA2+TF in FIG. 2) to synchronize the TXOPs of STA1 and STA2 on link 1 and link 2 by indicating at least the Physical Layer Conformance Procedure (PLCP) Protocol Data Unit (PPDU) length for a next transmission. The subsequent frame exchanges after the joint trigger may be synchronized by aligning the starting time and/or ending time of each PPDU within an overlapped TXOP duration. The TXOPs on link 1 and link 2 may end at different times.

Figure 3:
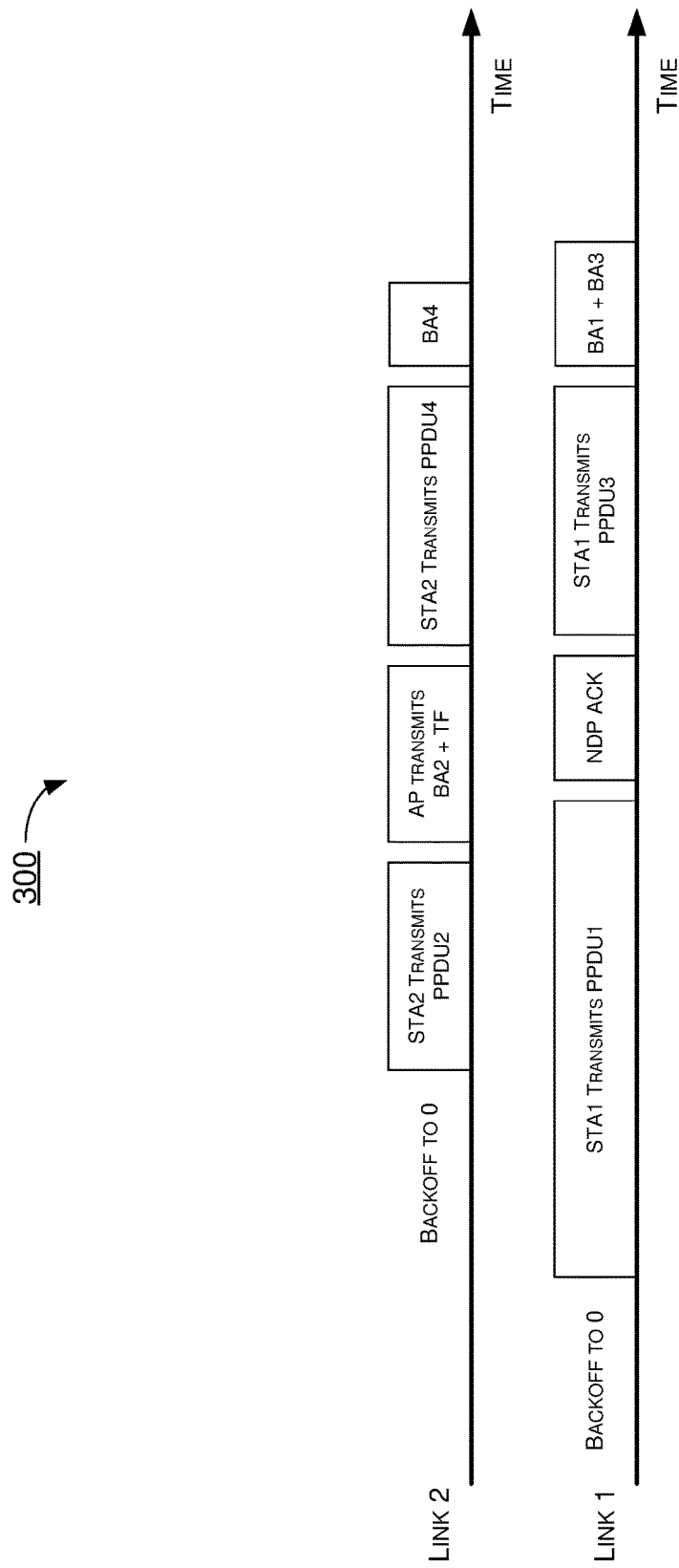
FIG. 3 is a diagram of an example scenario in accordance with the present disclosure.

FIG. 3 illustrates an example scenario 300 of controlled multi-link channel access and operation in accordance with the present disclosure. In scenario 300, both STA1 and STA2 may be associated with a co-located multi-link AP set. STA1 may obtain a TXOP using EDCA on link 1 when a backoff timer of STA1 counts down to 0. STA2 may obtain a TXOP using EDCA on link 2 when a backoff timer of STA2 counts down to 0. The co-located multi-link APs may transmit a trigger aggregated with a BA (e.g., shown as BA2+TF in FIG. 3) on link 2 to synchronize the TXOPs of STA1 and STA2 on link 1 and link 2 by indicating at least the PPDU length for a next transmission. The co-located multi-link AP on link 1 may transmit an NDP ACK to indicate either ACK or delayed BA and/or the PPDU length for the next transmission. Here, NDP ACK may include a physical (PHY) layer header but without medium access control (MAC) layer payload. The subsequent frame exchanges after a joint trigger by AP may be synchronized by aligning the starting time and/or ending time of each PPDU within an overlapped TXOP duration. The TXOPs on link 1 and link 2 may end at different times.

Figure 4:
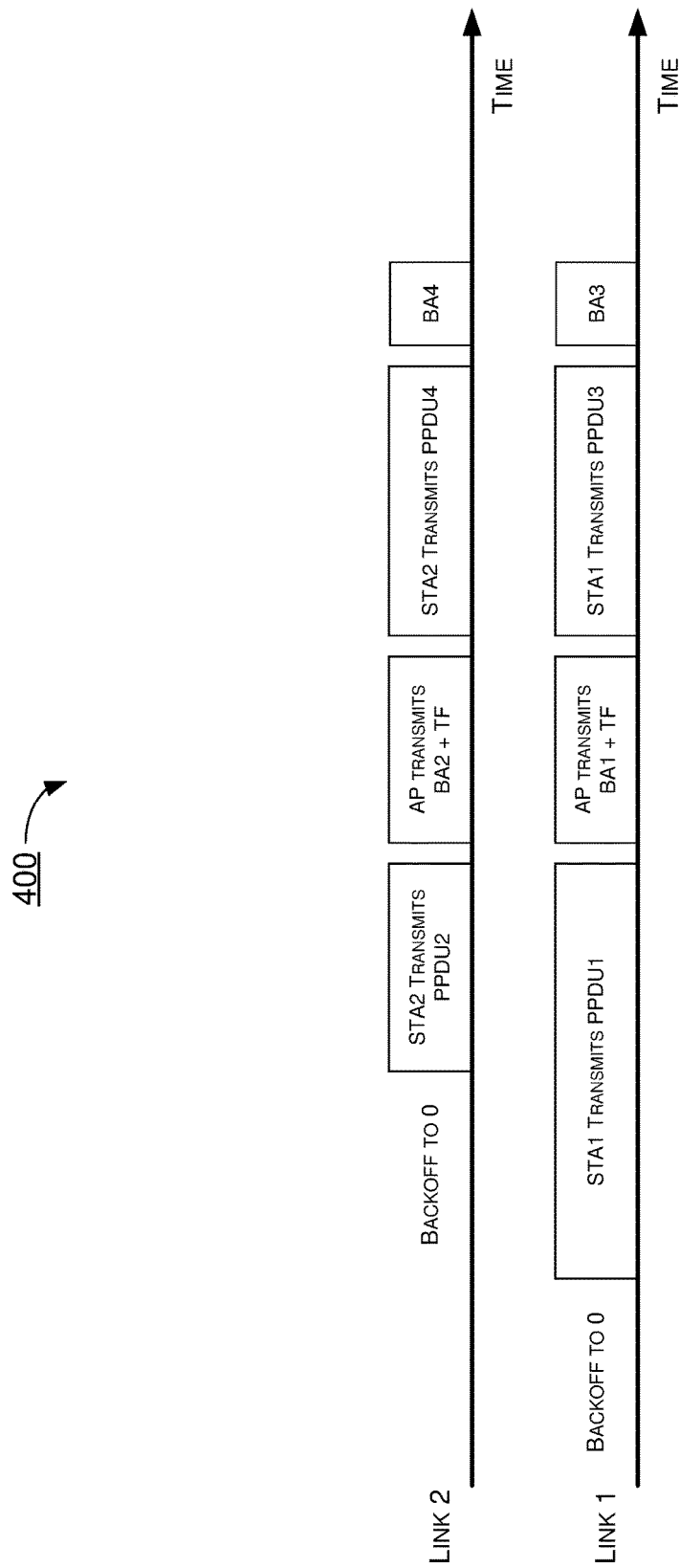
FIG. 4 is a diagram of an example scenario in accordance with the present disclosure.

FIG. 4 illustrates an example scenario 400 of controlled multi-link channel access and operation in accordance with the present disclosure. In scenario 400, both STA1 and STA2 may be associated with a co-located multi-link AP set (multi-link AP device, or AP MLD). STA1 may obtain a TXOP using EDCA on link 1 when a backoff timer of STA1 counts down to 0. STA2 is multi-link capable (STA2 MLD) and may monitor both link 1 and link 2. Accordingly, STA2 may detect the uplink transmission by STA1 on link 1 for an AP (e.g., AP 120) belonging to the same co-located multi-link AP set. (Intra-BSS uplink transmission, because the TXOP responder AP 120 on link1 is an AP affiliated with the AP MLD same as the AP MLD that STA2 MLD is associated with) and may obtain a TXOP using EDCA on link 2 when a backoff timer of STA2 counts down to 0 after detecting the intra-BSS uplink transmission on link1. The detection of the intra-BSS uplink transmission can be through inter-link coordination, e.g., the STA2 MLD has all the transmission information on both links and shares the information on both links. STA2's EDCA backoff may start before or after the detection of the intra-BSS uplink transmission on link1. Transmission of PPDU2 by STA2 may start later than transmission of PPDU1 by STA1 but may end at the same time based on the PPDU length decoded from PPDU1. The co-located multi-link APs may transmit a joint trigger aggregated with a BA (e.g., shown as BA1+TF and BA2+TF in FIG. 4) on both link 1 and link 2 to synchronize the TXOPs of STA1 and STA2 on link 1 and link 2 by indicating at least the PPDU length for a next transmission. The subsequent frame exchanges after the joint trigger may be synchronized by aligning the starting time and ending time of each PPDU.

Figure 5:
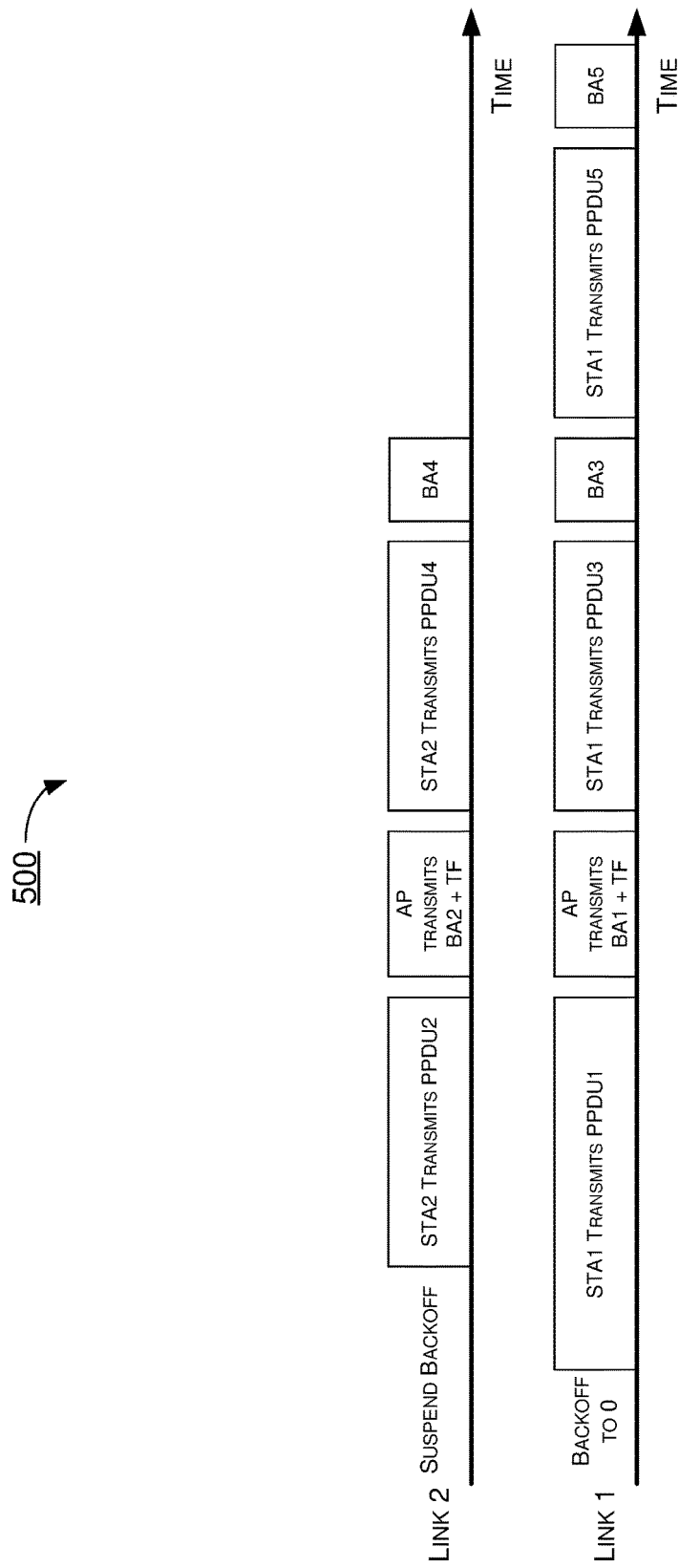
FIG. 5 is a diagram of an example scenario in accordance with the present disclosure.

FIG. 5 illustrates an example scenario 500 of controlled multi-link channel access and operation in accordance with the present disclosure. In scenario 500, both STA1 and STA2 may be associated with a co-located multi-link AP set (multi-link AP device, or AP MLD). STA1 may obtain a TXOP using EDCA on link 1 when a backoff timer of STA1 counts down to 0. STA2 is multi-link capable (STA2 MLD) and may monitor both link 1 and link 2. Accordingly, STA2 may detect the uplink transmission by STA1 on link 1 for an AP (e.g., AP 120) (Intra-BSS uplink transmission, because the TXOP responder AP 120 on link1 is an AP affiliated with the AP MLD same as the AP MLD that STA2 MLD is associated with) and may suspend a backoff procedure in case the detected PPDU1 is an intra-BSS uplink transmission. STA2 may also obtain a TXOP on link 2. Transmission of PPDU2 by STA2 may start later than transmission of PPDU1 by STA1 but may end at the same time based on the PPDU length decoded from PPDU1. The co-located multi-link APs may transmit a joint trigger aggregated with a BA (e.g., shown as BA1+TF and BA2+TF in FIG. 5) on both link 1 and link 2 to synchronize the TXOPs of STA1 and STA2 on link 1 and link 2 by indicating at least the PPDU length for a next transmission. The subsequent frame exchanges after the joint trigger may be synchronized by aligning the starting time and/or ending time of each PPDU within an overlapped TXOP duration. The TXOPs on link 1 and link 2 may end at different times.

Figure 6:
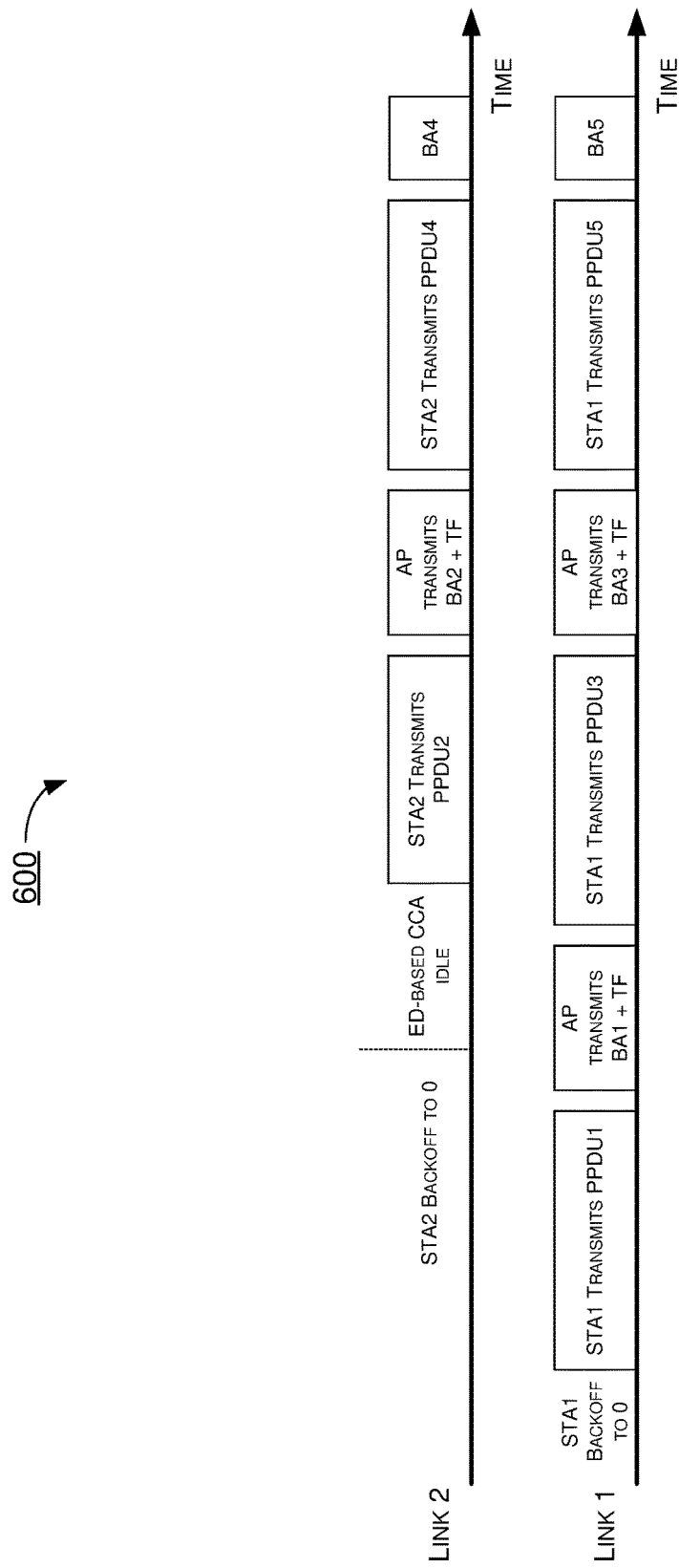
FIG. 6 is a diagram of an example scenario in accordance with the present disclosure.

FIG. 6 illustrates an example scenario 600 of controlled multi-link channel access and operation in accordance with the present disclosure. In scenario 600, both STA1 and STA2 may be associated with a co-located multi-link AP set. STA1 may obtain a TXOP using EDCA on link 1 when a backoff timer of STA1 counts down to 0. STA2 may monitor both link 1 and link 2. Accordingly, STA2 may detect TXOP of STA1 and may determine that the TXOP responder AP belongs to the same co-located multi-link AP set. STA2 may continue or initiate a backoff procedure until a backoff timer of STA2 counts down to 0. After backoff timer reaches 0, STA2 may wait until it detects the uplink transmission of PPDU3 by STA1 on link 1 and may decode the information on PPDU length of PPDU3 and, then, STA2 may obtain a TXOP on link 2 in case STA2 detects virtual CS idle (e.g., NAV=0) and ED-based CCA idle during the interval of the waiting time or point coordination function (PCF) interframe space (PIFS) immediately preceding the TXOP. Transmission of PPDU2 by STA2 may be later than transmission of PPDU3 by STA1 but may end at the same time based on the PPDU length decoded from a PHY header of PPDU3 (e.g., PPDU length). The co-located multi-link APs may transmit a joint trigger aggregated with a BA (e.g., shown as BA1+TF, BA2+TF and BA3+TF in FIG. 6) on both link 1 and link 2 to synchronize the TXOPs of STA1 and STA2 on link 1 and link 2 by indicating at least the PPDU length for a next transmission. The subsequent frame exchanges after the joint trigger may be synchronized by aligning the starting time and/or ending time of each PPDU within an overlapped TXOP duration. The TXOPs on link 1 and link 2 may end at different times or, alternatively, a TXOP obtained during ED-based CCA may not be longer than the TXOP obtained using EDCA.

Figure 7:
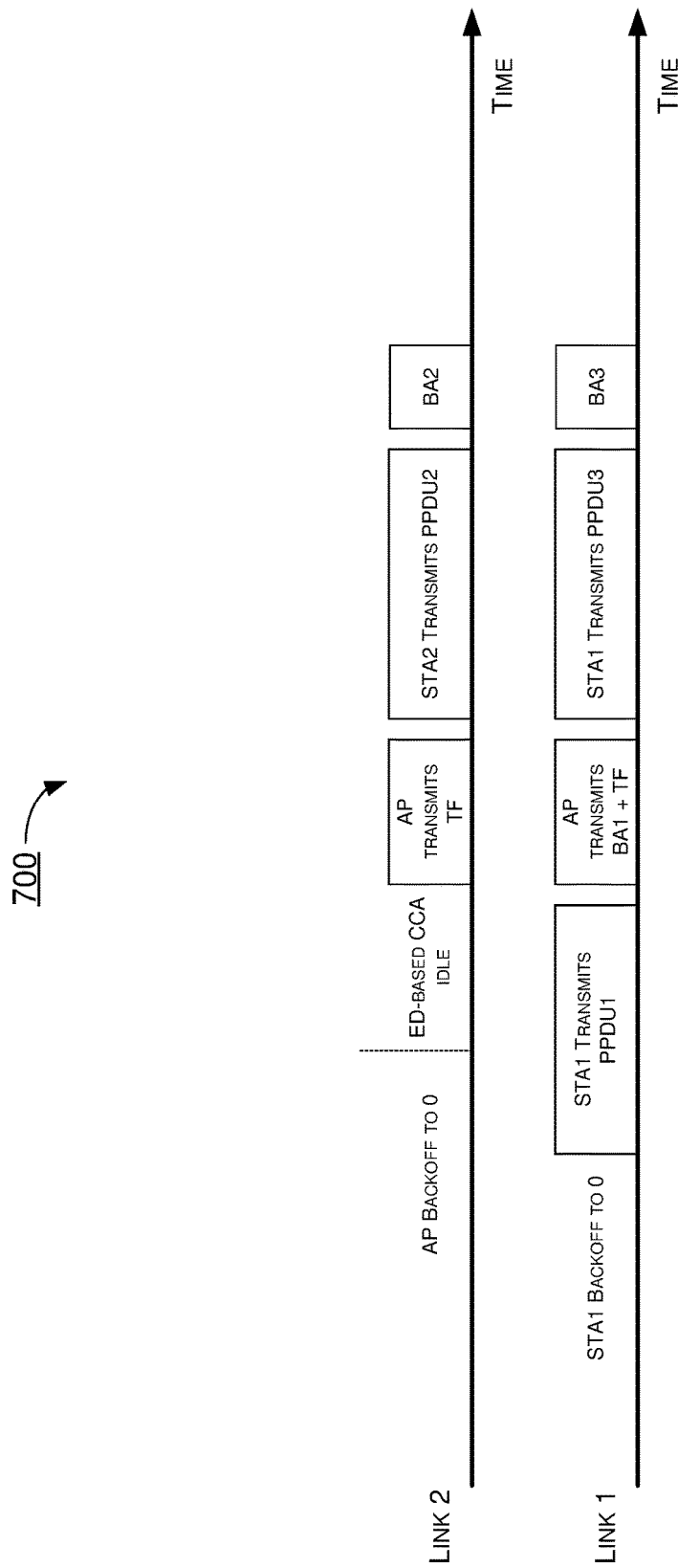
FIG. 7 is a diagram of an example scenario in accordance with the present disclosure.

FIG. 7 illustrates an example scenario 700 of controlled multi-link channel access and operation in accordance with the present disclosure. In scenario 700, both STA1 and STA2 may be associated with a co-located multi-link AP set. STA1 may obtain a TXOP using EDCA on link 1 when a backoff timer of STA1 counts down to 0. A multi-link AP (e.g., AP 120) may detect transmission by STA1 on link 1 and may obtain a TXOP using EDCA on link 2 when a backoff timer of the AP counts down to 0 in case there is an ongoing backoff procedure or initiating a backoff procedure. The AP may wait after backoff timer reaches 0 until the AP transmits on link1. The AP then detect virtual CS idle (e.g., NAV=0) and ED-based CCA idle during the interval of waiting time or PIFS immediately preceding the TXOP. The co-located multi-link AP on link 2 may obtain a TXOP to trigger STA2 for uplink transmission. The co-located multi-link APs may transmit a joint trigger aggregated with a BA on both link 1 and link 2 to synchronize the TXOPs on link 1 and link 2 by indicating at least the PPDU length for a next transmission. The subsequent frame exchanges after the joint trigger may be synchronized by aligning the starting time and/or ending time of each PPDU within an overlapped TXOP duration.

Figure 8:
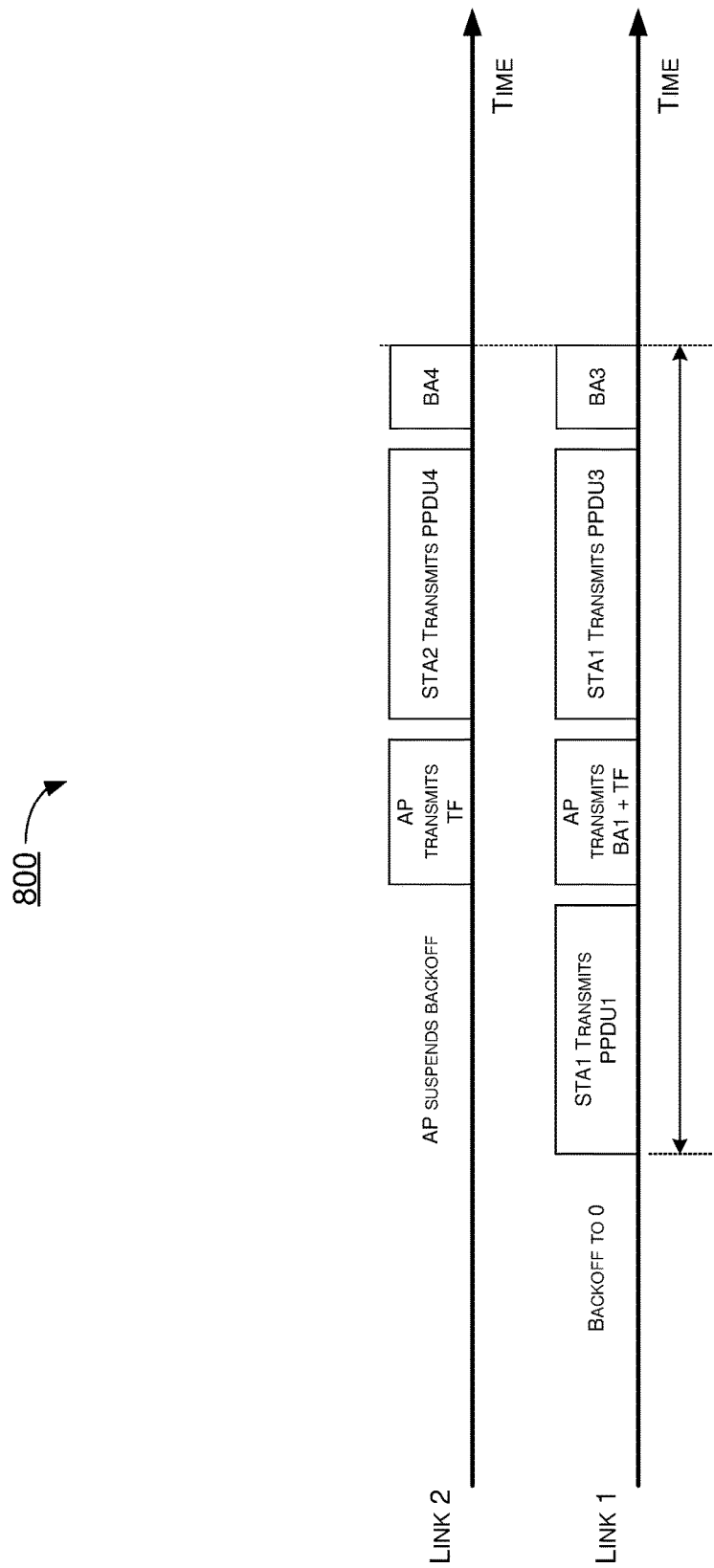
FIG. 8 is a diagram of an example scenario in accordance with the present disclosure.

FIG. 8 illustrates an example scenario 800 of controlled multi-link channel access and operation in accordance with the present disclosure. In scenario 800, both STA1 and STA2 may be associated with a co-located multi-link AP set. STA1 may obtain a TXOP using EDCA on link 1 when a backoff timer of STA1 counts down to 0. A multi-link AP (e.g., AP 120) may detect transmission by STA1 on link 1 and may suspend a current backoff timer and transmit a trigger on link 2 aligning with the transmission of the multi-link AP on link1. The co-located multi-link AP on link 2 may obtain a TXOP to trigger STA2 for uplink transmission. The co-located multi-link AP transmit a joint trigger aggregated with a BA on both link 1 and link 2 to synchronize the TXOPs on link 1 and link 2 by indicating at least the PPDU length for a next transmission. The subsequent frame exchanges after the joint trigger may be synchronized by aligning the starting time and/or ending time of each PPDU within an overlapped TXOP duration.

Figure 9:
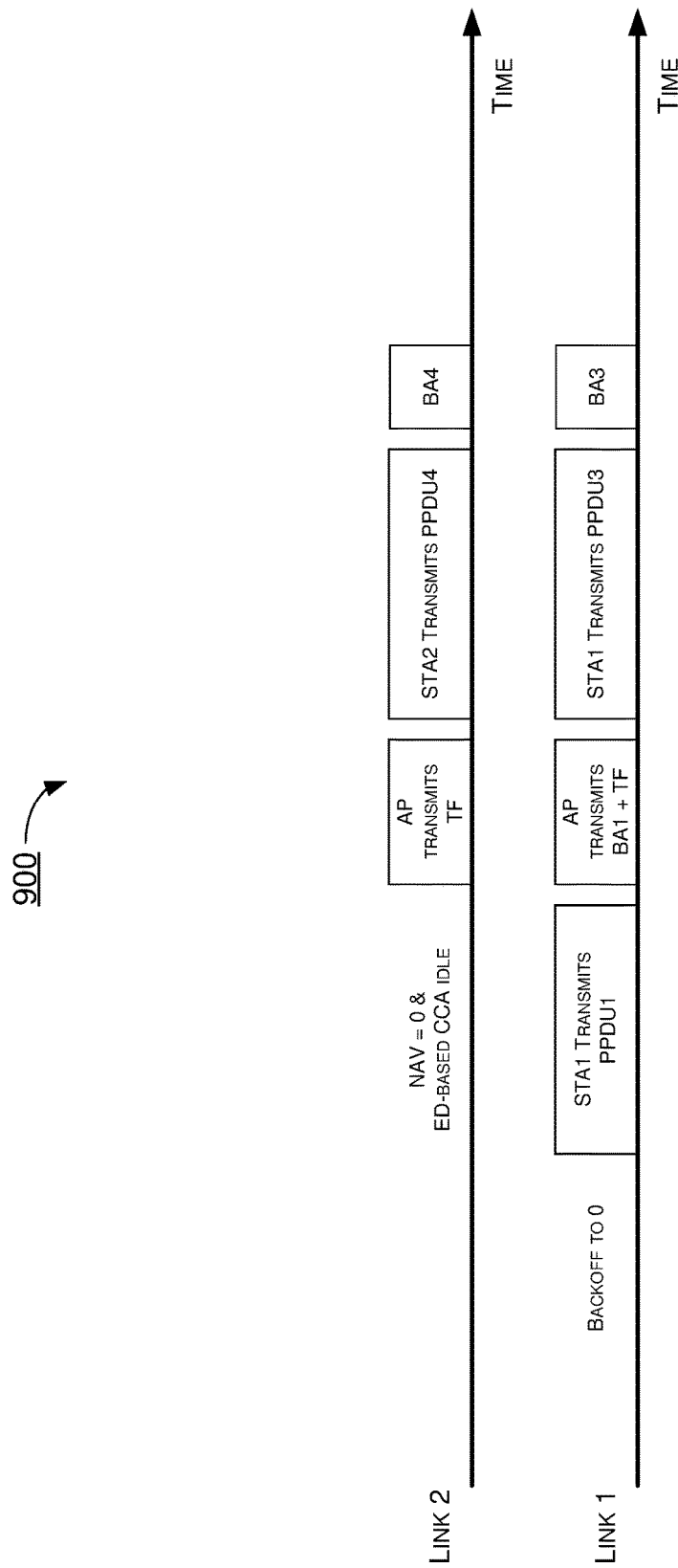
FIG. 9 is a diagram of an example scenario in accordance with the present disclosure.

FIG. 9 illustrates an example scenario 900 of controlled multi-link channel access and operation in accordance with the present disclosure. In scenario 900, both STA1 and STA2 may be associated with a co-located multi-link AP set. STA1 may obtain a TXOP using EDCA on link 1 when a backoff timer of STA1 counts down to 0. A multi-link AP (e.g., AP 120) may detect transmission by STA1 on link 1 and may wait until the start time of a transmission of the multi-link AP on link1 and detect virtual CS idle (e.g., NAV=0) and ED-based CCA idle on link 2 during an interval of waiting time or PIFS immediately preceding the start of transmission on link 2. The co-located multi-link AP on link 2 may obtain a TXOP to trigger STA2 for uplink transmission. The co-located multi-link AP transmit a joint trigger aggregated with a BA on both link 1 and link 2 to synchronize the TXOPs on link 1 and link 2 by indicating at least the PPDU length for a next transmission. The subsequent frame exchanges after the joint trigger may be synchronized by aligning the starting time and/or ending time of each PPDU within an overlapped TXOP duration.

Figure 10:
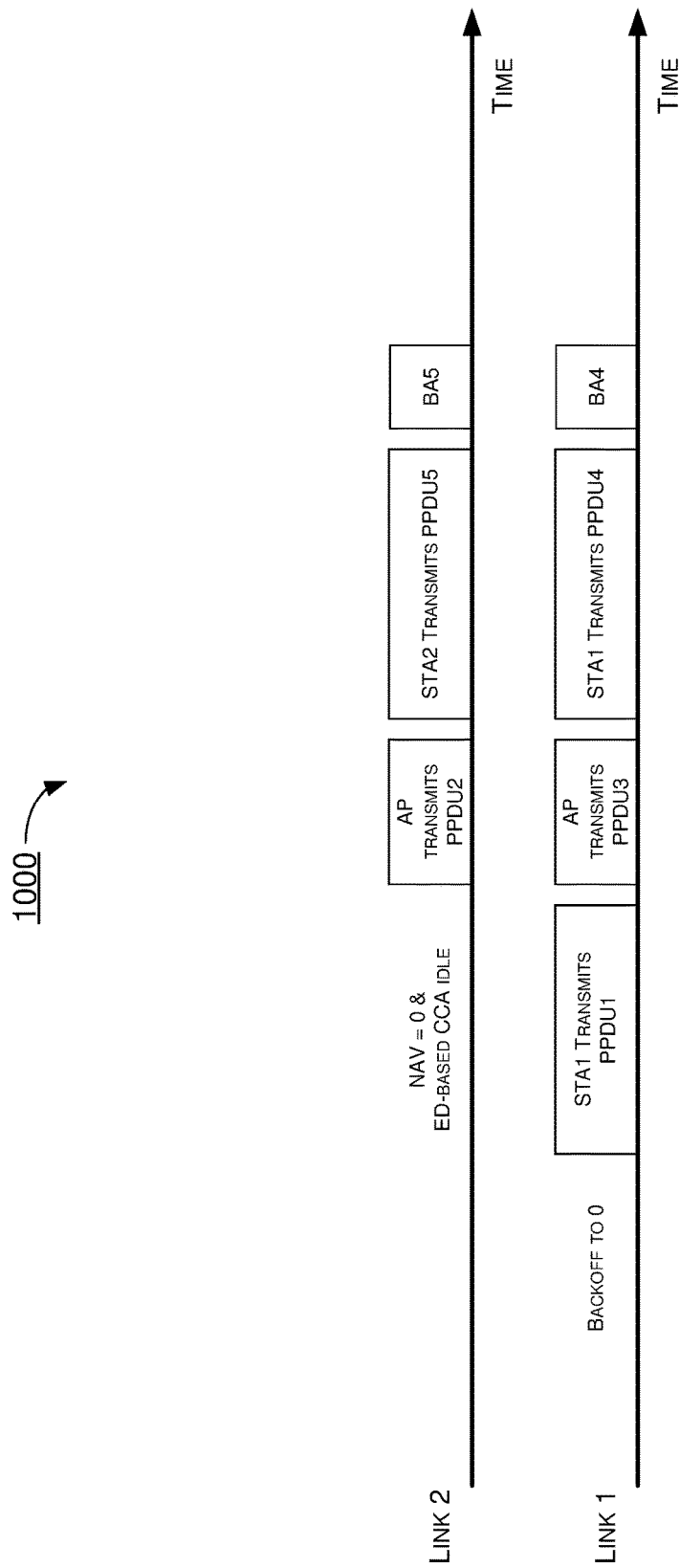
FIG. 10 is a diagram of an example scenario in accordance with the present disclosure.

FIG. 10 illustrates an example scenario 1000 of controlled multi-link channel access and operation in accordance with the present disclosure. In scenario 1000, both STA1 and STA2 may be associated with a co-located multi-link AP set. STA1 may obtain a TXOP using EDCA on link 1 when a backoff timer of STA1 counts down to 0. A multi-link AP (e.g., AP 120) may detect transmission by STA1 on link 1 and may wait until the start time of the transmission of the multi-link AP on link1 without initiating a backoff procedure on link2 and detect virtual CS idle (e.g., NAV=0) and ED-based CCA idle on link 2 during an interval of the waiting time or PIFS immediately preceding the start of transmission on link 2. The co-located multi-link AP on link 2 then obtain a TXOP to trigger STA2 for uplink transmission. The co-located multi-link AP on link 1 may transmit PPDU3 including at least a BA and a trigger frame to STA1 and/or downlink data to STA1 or other STA(s). The co-located multi-link AP on link 2 may transmit PPDU2 including at least a BA and a trigger frame to STA2 and/or downlink data to STA2 or other STA(s). The co-located multi-link AP transmit a joint trigger aggregated with a BA on both link 1 and link 2 to synchronize the TXOPs on link 1 and link 2 by indicating at least the PPDU length for a next transmission. The subsequent frame exchanges after the joint trigger may be synchronized by aligning the starting time and/or ending time of each PPDU within an overlapped TXOP duration.

Figure 11:
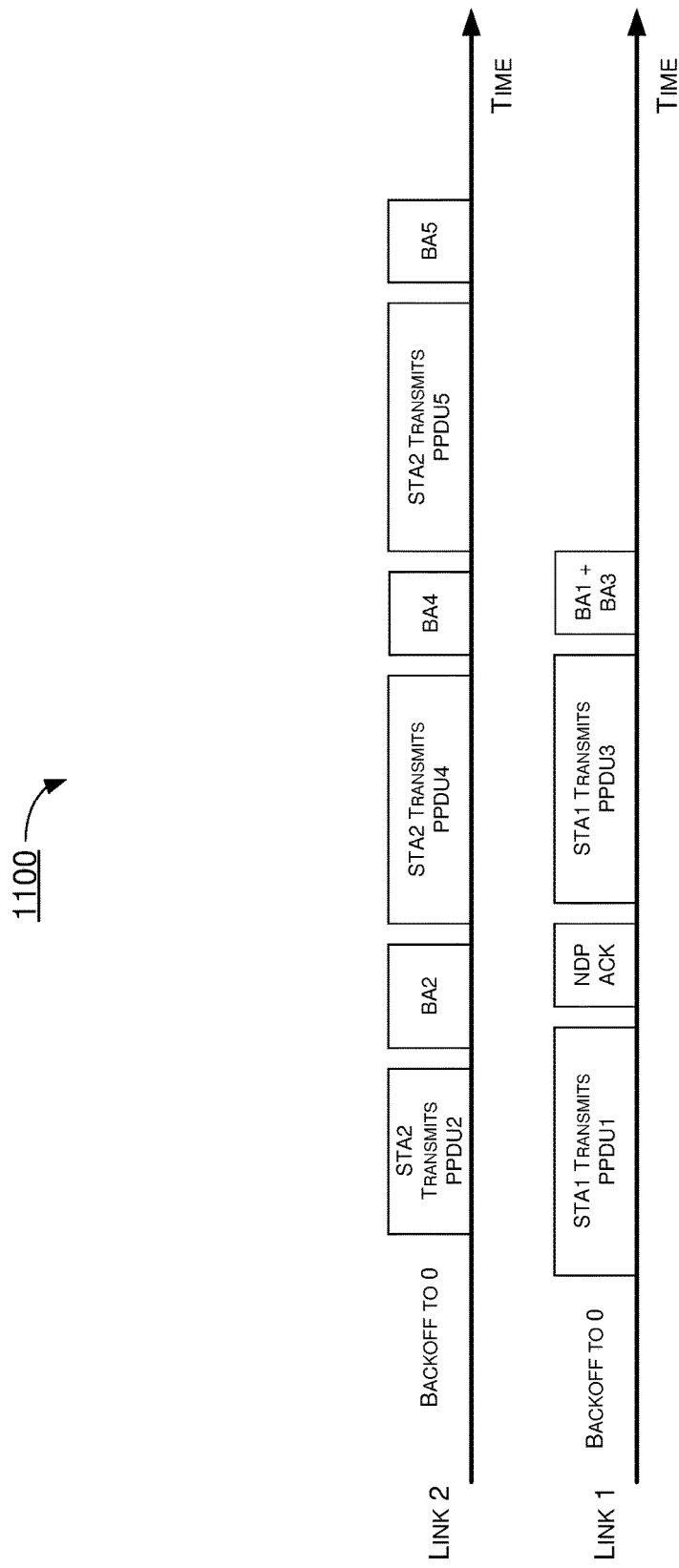
FIG. 11 is a diagram of an example scenario in accordance with the present disclosure.

FIG. 11 illustrates an example scenario 1100 of controlled multi-link channel access and operation in accordance with the present disclosure. In scenario 1100, both STA1 and STA2 may be associated with a co-located multi-link AP set. STA1 may support trigger-based uplink transmissions on either link 1 or link 2. STA2 may be associated with an AP (e.g., AP 120) and may operate on link 2, yet STA2 may not support trigger-based uplink transmissions. STA1 may obtain a TXOP using EDCA on link 1 when a backoff timer of STA1 counts down to 0. STA2 may obtain a TXOP using EDCA on link 2 when a backoff timer of STA2 counts down to 0. The co-located multi-link AP on link 1 may transmit an NDP ACK for PPDU1 of STA1 to indicate delayed BA. The NDP ACK may be short enough to avoid interference with the subsequent uplink transmission PPDU4 on link 2. The NDP ACK may only have a PHY header containing at least one or more pieces of information such as, for example and without limitation, an identification (ID) of TXOP holder, an indication of ACK or delayed BA, and a next PPDU length. The co-located multi-link AP on link 1 may transmit delayed BA for PPDU1 together with BA for PPDU3.

Figure 12:
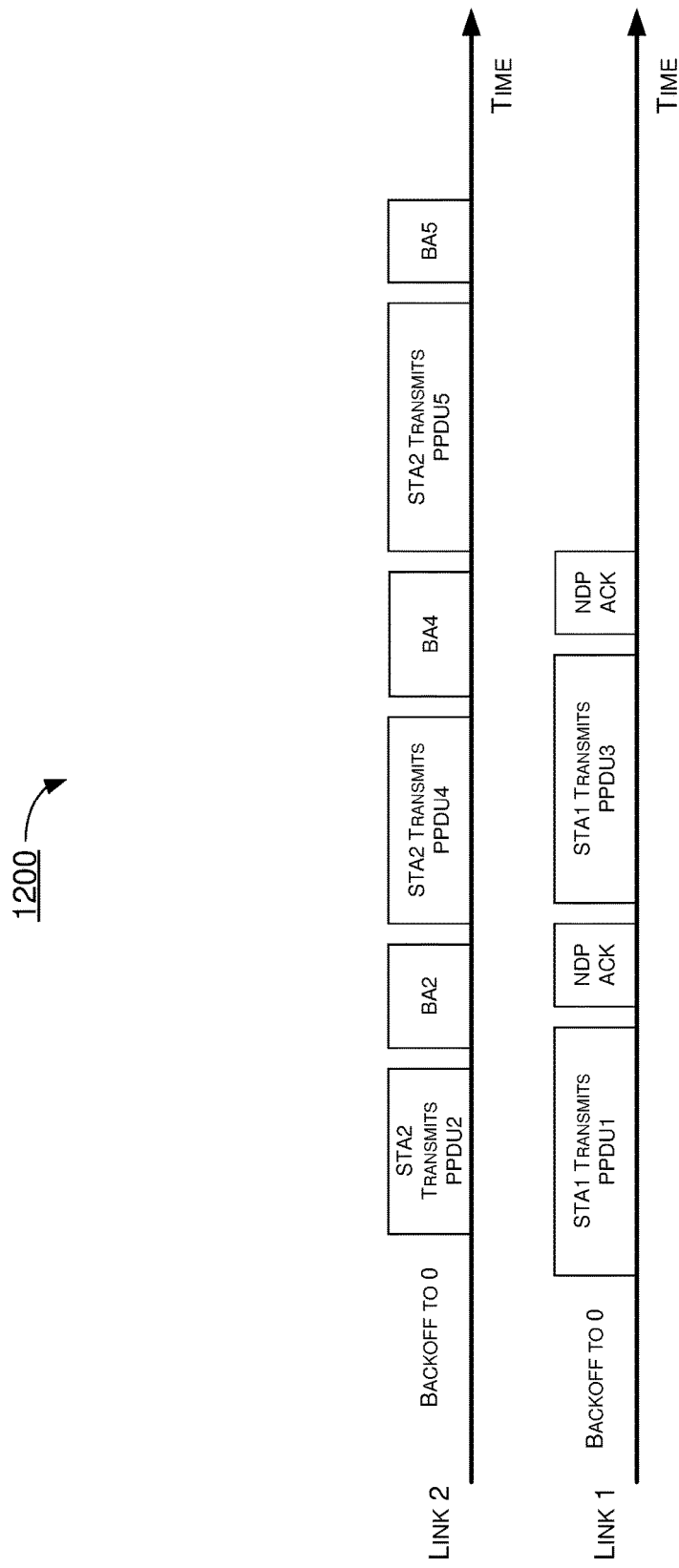
FIG. 12 is a diagram of an example scenario in accordance with the present disclosure.

FIG. 12 illustrates an example scenario 1200 of controlled multi-link channel access and operation in accordance with the present disclosure. In scenario 1200, both STA1 and STA2 may be associated with a co-located multi-link AP set. STA1 may support trigger-based uplink transmissions on either link 1 or link 2. STA2 may be associated with an AP (e.g., AP 120) and may operate on link 2, yet STA2 may not support trigger-based uplink transmissions. STA1 may obtain a TXOP using EDCA on link 1 when a backoff timer of STA1 counts down to 0. STA2 may obtain a TXOP using EDCA on link 2 when a backoff timer of STA2 counts down to 0. The co-located multi-link AP on link 1 may transmit an NDP ACK for PPDU1 of STA1 to indicate ACK for PPDU1 if all MPDUs in PPDU1 are correctly received and the length of PPDU3. The co-located multi-link AP on link 1 may transmit an NDP ACK for PPDU3 of STA1 to indicate delayed ACK for PPDU3 if not all MPDUs in PPDU3 are correctly received and may terminate the TXOP by indicating a next PPDU length to be 0. The NDP ACK may be short enough to avoid interference with the subsequent uplink transmission by STA2 on link 2. STA1 may request a BA for PPDU3 in another TXOP.

Figure 13:
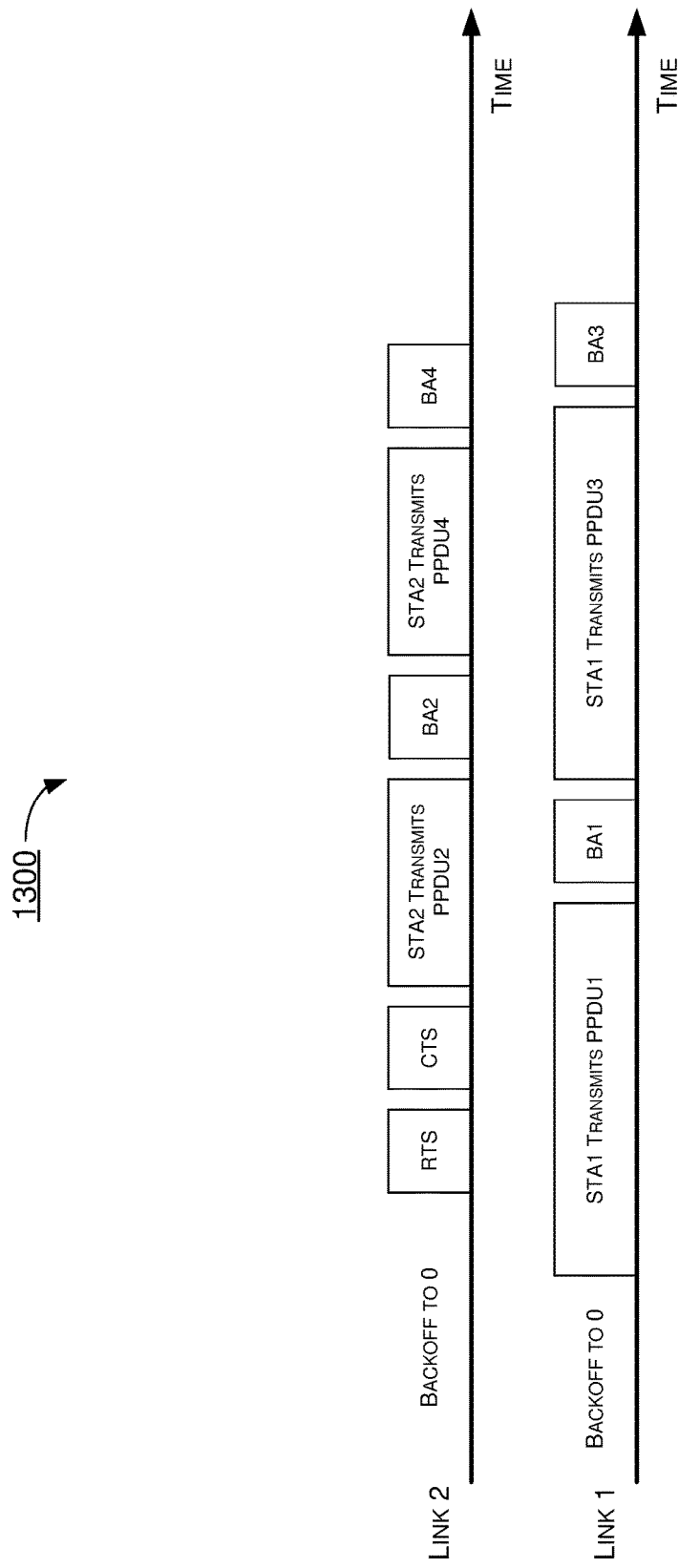
FIG. 13 is a diagram of an example scenario in accordance with the present disclosure.

FIG. 13 illustrates an example scenario 1300 of controlled multi-link channel access and operation in accordance with the present disclosure. In scenario 1300, STA1 may be associated with a first BSS (BSS1) which may be an overlapping BSS (OBSS) of a BSS set up by a co-located multi-link AP set on link 1. STA2 may be associated with a co-located multi-link AP (e.g., AP2) on link 2 which may be affiliated to the co-located multi-link AP set. STA1 may obtain a TXOP using EDCA on link 1 when a backoff timer of STA1 counts down to 0. STA2 may detect a TXOP on link 1 and determine the TXOP as an OBSS TXOP. STA2 may transmit a request-to-send (RTS) frame using EDCA on link 2 when a backoff timer of STA2 counts down to 0. The co-located multi-link AP (AP2) may respond to the RTS on link 2 by a clear-to-send (CTS) frame in case of at least one of the following conditions: (i) detection of an OBSS TXOP on link 1, and (ii) not participating an ongoing TXOP on link 1. STA2 may obtain a TXOP on link 2 after successful RTS/CTS frame exchange on link 2. STA2 may limit the duration of its TXOP on link 2 to be equal to or less than the duration of the OBSS TXOP on link 1.

Illustrative Implementations

Figure 14:
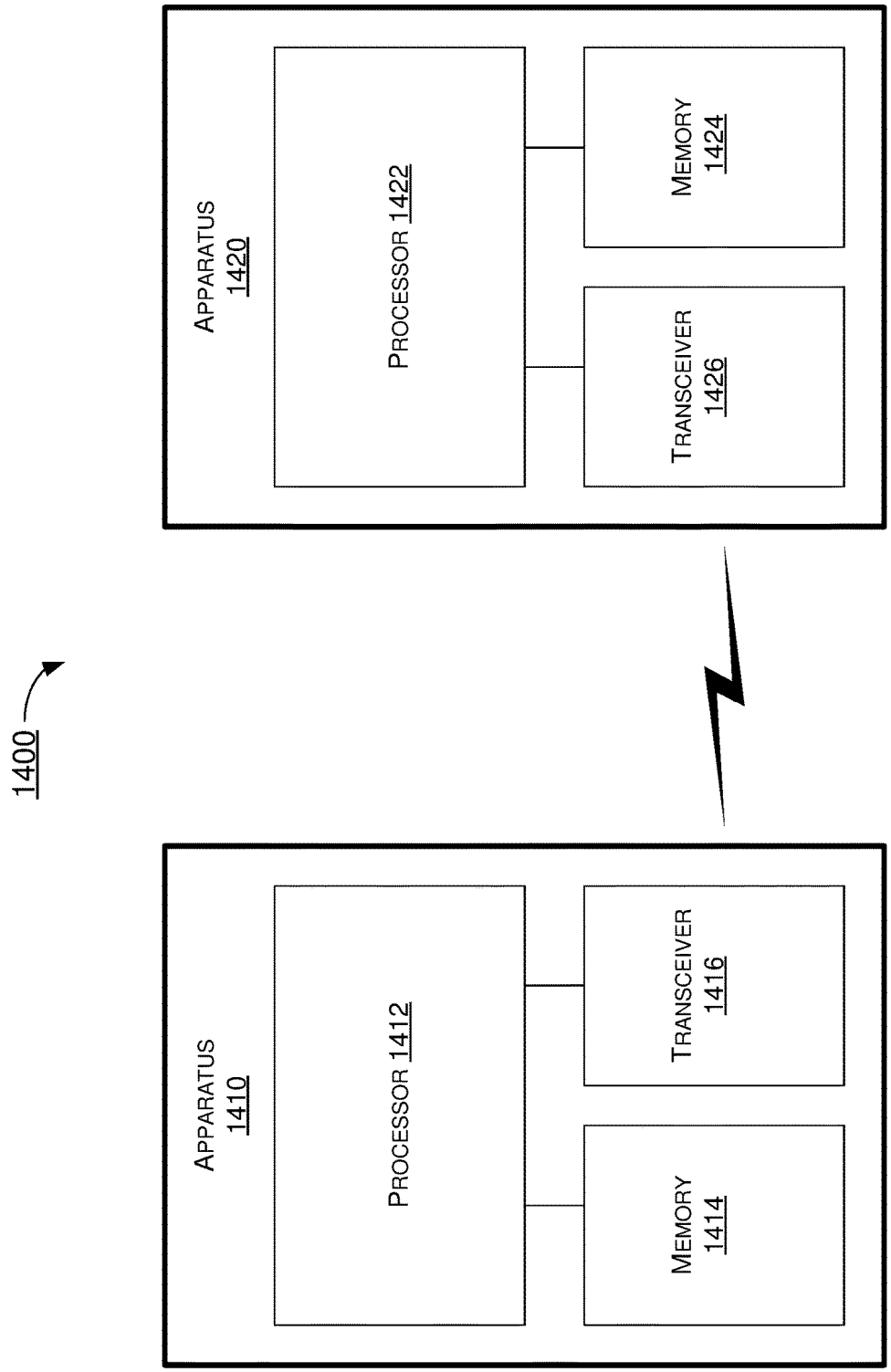
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to multi-link channel access and operation with efficient utilization of multi-link resources in wireless communications, including the various schemes described above with respect to various proposed designs, concepts, schemes, systems and methods described above as well as processes described below. For instance, apparatus 1410 may be implemented in STA 110 or STA 115 and apparatus 1420 may be implemented in AP 120 or AP 125, or vice versa.

Each of apparatus 1410 and apparatus 1420 may be a part of an electronic apparatus, which may be a STA or an AP, such as a portable or mobile apparatus, a wearable apparatus, a wireless communication apparatus or a computing apparatus. When implemented in a STA, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a STA or an AP. Each of apparatus 1410 and apparatus 1420 may include at least some of those components shown in FIG. 14 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 14 nor described below in the interest of simplicity and brevity.

In one aspect, each of processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, each of processor 1412 and processor 1422 may include multiple processors in some implementations and a single processor in other implementations in accordance with the present disclosure. In another aspect, each of processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1412 and processor 1422 is a special-purpose machine specifically designed, arranged and configured to perform specific tasks including those pertaining to multi-link channel access and operation with efficient utilization of multi-link resources in wireless communications in accordance with various implementations of the present disclosure.

In some implementations, apparatus 1410 may also include a transceiver 1416 coupled to processor 1412. Transceiver 1416 may include a transmitter capable of wirelessly transmitting and a receiver capable of wirelessly receiving data. In some implementations, apparatus 1420 may also include a transceiver 1426 coupled to processor 1422. Transceiver 1426 may include a transmitter capable of wirelessly transmitting and a receiver capable of wirelessly receiving data.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as STA 110 (STA1), STA 115 (STA2) or AP 120, and apparatus 1420, as another of STA 110 (STA1), STA 115 (STA2) or AP 120, is provided below. It is noteworthy that, although the example implementations described below are provided in the context of WLAN, the same may be implemented in other types of networks.

Under a proposed scheme pertaining to multi-link channel access and operation with efficient utilization of multi-link resources in accordance with the present disclosure, with apparatus 1410 implemented in or as STA 115 (STA2) and apparatus 1420 implemented in or as AP 120, or vice versa, of a wireless network such as a WLAN in network environment 100 in accordance with one or more of IEEE 802.11 standards, processor 1412 of apparatus 1410, capable of multi-link operations with respect to a first link and a second link (e.g., link 1 and link 2), may obtain, via transceiver 1416, a second TXOP on the second link after one other apparatus (e.g., STA 110 or STA1) has started a first TXOP on the first link. Additionally, processor 1412 of apparatus 1410 may perform, via transceiver 1416, one or more transmissions to apparatus 1420 during the second TXOP on the second link such that the second TXOP is at least partially synchronized with the first TXOP on the first link.

In some implementations, in obtaining the second TXOP on the second link, processor 1412 may obtain the second TXOP using contention-based channel access. For instance, in obtaining the second TXOP using the contention-based channel access, processor 1412 may perform virtual carrier sensing, ED-based CCA backoff, or a combination thereof. The EDCA backoff procedure may be resumed or initiated by the detection of the TXOP on the first link.

In some implementations, in obtaining the second TXOP on the second link, processor 1412 may perform certain operations. For instance, processor 1412 may detect an intra-BSS uplink transmission (e.g., by decoding the uplink/downlink indication, BSS color, STA-ID or the like in the PHY header of the detected PPDU) by the other apparatus on the first link. Moreover, processor 1412 may obtain the second TXOP using EDCA on the second link upon a backoff timer counting down to 0 after detecting the intra-BSS transmission on the first link.

In some implementations, apparatus 1410 may be implemented in a second STA (e.g., STA 115 or STA2) and the other apparatus may be implemented in a first STA (e.g., STA 110 or STA1). In such cases, in performing the one or more transmissions during the second TXOP on the second link such that the second TXOP is at least partially synchronized (e.g., with uplink transmission alignment and downlink transmission alignment) with the first TXOP on the first link, processor 1412 may perform certain operations. For instance, processor 1412 may decode a first PPDU transmitted by the other apparatus (e.g., a non-AP STA) on the first link to determine at least a length of the first PPDU (e.g., by decoding the PHY header), a BSS color, an uplink indication, and/or a TXOP duration. Also, processor 1412 may determine the first PPDU to be an intra-BSS PPDU. Additionally, processor 1412 may control transmission of a second PPDU on the second link to align an ending time of the second PPDU with an ending time of the first PPDU based on the length of the first PPDU. Moreover, processor 1412 may receive a trigger along with an acknowledgement with respect to the second PPDU. The trigger (e.g., a trigger frame (TF)) may trigger the second STA to perform an uplink transmission on the second link. Additionally, the trigger may indicate a PPDU length for a next transmission by each of the first STA and the second STA.

In some implementations, apparatus 1410 may be implemented in a second STA (e.g., STA 115 or STA2) and the other apparatus may be implemented in a first STA (e.g., STA 110 or STA1). In such cases, in performing the one or more transmissions during the second TXOP on the second link such that the second TXOP is at least partially synchronized (e.g., ending time of the second TXOP alignment) with the first TXOP on the first link, processor 1412 may perform certain operations. For instance, processor 1412 may decode a first PPDU transmitted by the other apparatus (e.g., a non-AP STA) on the first link to determine (e.g., by decoding the PHY header) at least a length of the first PPDU, a BSS color, an uplink indication, and/or a TXOP duration. Additionally, processor 1412 may determine the first TXOP to be an OBSS. Moreover, processor 1412 may transmit a RTS frame to the associated AP and receive a CTS frame from the associated AP in case of at least one of the following conditions: (i) detection of an OBSS TXOP on link 1 by the co-located multi-link AP, and (ii) the co-located multi-link AP not participating an ongoing TXOP on link 1. Furthermore, processor 1412 may control an ending time of a second TXOP on the second link to either: (i) align the ending time of the second TXOP on the second link with an ending time of the first TXOP on the first link, or (ii) result in a duration of the second TXOP on the second link to be within a duration of the first TXOP.

In some implementations, in obtaining the second TXOP on the second link, processor 1412 may perform certain operations. For instance, processor 1412 may detect an intra-BSS uplink TXOP of the other apparatus on the first link. Additionally, processor 1412 may perform a backoff procedure to allow a backoff timer counting down to 0. Moreover, processor 1412 may detect virtual carrier sensing idle and ED-based CCA idle on the second link while waiting for the start of an uplink transmission within the intra-BSS TXOP. In some implementations, in detecting the virtual carrier sensing idle and the ED-based CCA idle on the second link while waiting for the start of the transmission within the intra-BSS TXOP, processor 1412 may detect the virtual carrier sensing idle and the ED-based CCA idle on the second link during an interval of a waiting time or PIFS immediately preceding the second TXOP and obtain the second TXOP.

In some implementations, in obtaining the second TXOP on the second link, processor 1412 may perform certain operations. For instance, processor 1412 may detect a transmission by the other apparatus on the first link. Moreover processor 1412 may perform: (a) suspending a backoff procedure on the second link, (b) detecting virtual carrier sensing idle and ED-based CCA idle on the second link during an interval of PIFS immediately preceding the second TXOP, or (c) both.

In some implementations, apparatus 1410 may be implemented in an AP (e.g., AP 120) and apparatus 1420 may be implemented in a first STA (e.g., STA 110 or STA1). In such cases, in performing the one or more transmissions during the second TXOP on the second link such that the second TXOP is at least partially synchronized (e.g., with uplink transmission alignment and downlink transmission alignment) with the first TXOP (e.g., intra-BSS uplink TXOP) on the first link, processor 1412 may perform certain operations. For instance, processor 1412 may transmit, on the first link, a first trigger along with an acknowledgement with respect to a first PPDU transmitted by the first STA. Additionally, processor 1412 may transmit, on the second link, a second trigger to trigger a second STA for an uplink transmission on the second link. In such cases, each of the first trigger and the second trigger may indicate a PPDU length for a next transmission by each of the first STA and the second STA.

In some implementations, apparatus 1410 may be implemented in an AP (e.g., AP 120) and apparatus 1420 may be implemented in a first STA (e.g., STA 110 or STA1). In such cases, in performing the one or more transmissions during the second TXOP on the second link such that the second TXOP is at least partially synchronized (e.g., with uplink transmission alignment and downlink transmission alignment) with the first TXOP (e.g., intra-BSS uplink TXOP) on the first link, processor 1412 may perform certain operations. For instance, processor 1412 may transmit, on the first link or the second link, a short feedback instead of a normal BA in response to receiving a PPDU from the first STA on the first link or from the second STA on the second link.

In some implementations, the short feedback may include an NDP ACK having a PHY layer header without any MAC layer payload. In some implementations, the PHY header may contain information comprising an ID of a TXOP holder, an indication of ACK or delayed BA, a length of a next PPDU, or a combination thereof.

In some implementations, in performing the one or more transmissions during the second TXOP on the second link such that the second TXOP is at least partially synchronized with the first TXOP (e.g., intra-BSS uplink TXOP) on the first link, processor 1412 may control a length of the one or more transmissions of the second TXOP to achieve either alignment of uplink TX and downlink TX on the first link and the second link or minimum overlapping of downlink and uplink transmission times within an overlap between the first TXOP and the second TXOP or ending points of the first TXOP and the second TXOP or an earlier ending point of the second TXOP.

In some implementations, in performing the one or more transmissions during the second TXOP on the second link such that the second TXOP is at least partially synchronized (e.g., with uplink transmission alignment and downlink transmission alignment) with the first TXOP on the first link, processor 1412 may perform certain operations. For instance, processor 1412 may decode a first PPDU (e.g., intra-BSS uplink PPDU) transmitted by the other apparatus on the first link to determine at least a length of the first PPDU (e.g., by decoding the PHY layer header), a BSS color, an uplink indication, and/or a TXOP duration. Additionally, processor 1412 may control transmission of a second PPDU on the second link to align an ending time of the second PPDU with an ending time of the first PPDU based on the length of the first PPDU. Moreover, processor 1412 may receive, from an AP (e.g., AP 120), a trigger along with an acknowledgement with respect to the second PPDU. Furthermore, processor 1412 may transmit, responsive to receiving the trigger, a fourth PPDU on the second link having a starting time and an ending time aligned with a starting time and an ending time of a third PPDU transmitted by the other apparatus on the first link.

In some implementations, the trigger may indicate a PPDU length for a next transmission by each of the apparatus and the other apparatus.

In some implementations, apparatus 1410 may be implemented in a second STA (e.g., STA 115 or STA2) and apparatus 1420 may be implemented in a first STA (e.g., STA 110 or STA1). In such cases, in performing the one or more transmissions during the second TXOP on the second link such that the second TXOP is at least partially synchronized with the first TXOP (e.g., intra-BSS uplink TXOP) on the first link, processor 1412 may receive a BA from an AP (e.g., AP 120) with respect to each uplink transmission on the second link while the first STA receives an NDP ACK with respect to each uplink transmission on the first link.

Under another proposed scheme pertaining to multi-link channel access and operation with efficient utilization of multi-link resources in accordance with the present disclosure, with apparatus 1410 implemented in or as STA 115 (STA2) and apparatus 1420 implemented in or as AP 120, or vice versa, of a wireless network such as a WLAN in network environment 100 in accordance with one or more of IEEE 802.11 standards, processor 1412 of apparatus 1410, capable of multi-link operations with respect to a first link and a second link (e.g., link 1 and link 2), may obtain, via transceiver 1416, a first TXOP on the first link. Additionally, processor 1412 may perform, via transceiver 1416, one or more transmissions during the first TXOP (e.g., intra-BSS uplink TXOP) on the first link such that the first TXOP is at least partially synchronized (e.g., with uplink transmission alignment and downlink transmission alignment) with a second TXOP obtained by one other apparatus on the second link.

In some implementations, in obtaining the first TXOP on the first link, processor 1412 may obtain the first TXOP using contention-based channel access, virtual carrier sensing, ED-based CCA, or a combination thereof.

In some implementations, in performing the one or more transmissions during the first TXOP (e.g., intra-BSS uplink TXOP) on the first link such that the first TXOP is at least partially synchronized with the second TXOP on the second link, processor 1412 may receive a short feedback instead of a normal BA as a response to one of the one or more transmissions, and wherein the short feedback is shorter than the normal BA.

In some implementations, the short feedback may include an NDP ACK having a PHY layer header without any MAC layer payload. In such cases, the PHY header may contain information comprising an ID of a TXOP holder, an indication of ACK or delayed BA, a length of a next PPDU, or a combination thereof.

Illustrative Processes

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to multi-link channel access and operation with efficient utilization of multi-link resources in wireless communications in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 implemented in or as STA 115 (STA2) and apparatus 1420 implemented in or as AP 120, or vice versa, of a wireless network such as a WLAN in network environment 100 in accordance with one or more of IEEE 802.11 standards. Process 1500 may begin at block 1510.

At 1510, process 1500 may involve processor 1412 of apparatus 1410 capable of multi-link operations with respect to a first link and a second link (e.g., link 1 and link 2) obtaining, via transceiver 1416, a second TXOP on the second link after one other apparatus (e.g., STA 110 or STA1) has started a first TXOP (intra-BSS Uplink TXOP) on the first link. Process 1500 may proceed from 1510 to 1520.

At 1520, process 1500 may involve processor 1412 performing, via transceiver 1416, one or more transmissions to apparatus 1420 during the second TXOP on the second link such that the second TXOP is at least partially synchronized with the first TXOP (intra-BSS Uplink TXOP) on the first link.

In some implementations, in obtaining the second TXOP on the second link, process 1500 may involve processor 1412 obtaining the second TXOP using contention-based channel access. For instance, in obtaining the second TXOP using the contention-based channel access, process 1500 may involve processor 1412 performing virtual carrier sensing, ED-based CCA, or a combination thereof.

In some implementations, in obtaining the second TXOP on the second link, process 1500 may involve processor 1412 performing certain operations. For instance, process 1500 may involve processor 1412 detecting an intra-BSS transmission by the other apparatus on the first link. Moreover, process 1500 may involve processor 1412 obtaining the second TXOP using EDCA on the second link upon a backoff timer counting down to 0 after detecting the intra-BSS transmission on the first link.

In some implementations, apparatus 1410 may be implemented in a second STA (e.g., STA 115 or STA2) and the other apparatus may be implemented in a first STA (e.g., STA 110 or STA1). In such cases, in performing the one or more transmissions during the second TXOP on the second link such that the second TXOP is at least partially synchronized with the first TXOP (e.g., intra-BSS uplink TXOP) on the first link, process 1500 may involve processor 1412 performing certain operations. For instance, process 1500 may involve processor 1412 decoding a first PPDU transmitted by the other apparatus on the first link to determine at least a length of the first PPDU (e.g., by decoding the PHY layer header), a BSS color, an uplink indication, and/or a TXOP duration. Also, process 1500 may involve processor 1412 determining the first PPDU to be an intra-BSS PPDU. Additionally, process 1500 may involve processor 1412 controlling transmission of a second PPDU on the second link to align an ending time of the second PPDU with an ending time of the first PPDU based on the length of the first PPDU. Moreover, process 1500 may involve processor 1412 receiving a trigger along with an acknowledgement with respect to the second PPDU. The trigger (e.g., a trigger frame (TF)) may trigger the second STA to perform an uplink transmission on the second link. Additionally, the trigger may indicate a PPDU length for a next transmission by each of the first STA and the second STA.

In some implementations, apparatus 1410 may be implemented in a second STA (e.g., STA 115 or STA2) and the other apparatus may be implemented in a first STA (e.g., STA 110 or STA1). In such cases, in performing the one or more transmissions during the second TXOP on the second link such that the second TXOP is at least partially synchronized (e.g., ending time of the second TXOP alignment) with the first TXOP on the first link, process 1500 may involve processor 1412 performing certain operations. For instance, process 1500 may involve processor 1412 decoding a first PPDU transmitted by the other apparatus (e.g., a non-AP STA) on the first link to determine (e.g., by decoding the PHY header) at least a length of the first PPDU, a BSS color, an uplink indication, and/or a TXOP duration. Additionally, process 1500 may involve processor 1412 determining the first TXOP to be an OBSS. Moreover, process 1500 may involve processor 1412 transmitting, via transceiver 1416, a RTS frame to the associated AP and receive a CTS frame from the associated AP in case of at least one of the following conditions: (i) detection of an OBSS TXOP on link 1 by the co-located multi-link AP, and (ii) the co-located multi-link AP not participating an ongoing TXOP on link 1. Furthermore, process 1500 may involve processor 1412 controlling an ending time of a second TXOP on the second link to either: (i) align the ending time of the second TXOP on the second link with an ending time of the first TXOP on the first link, or (ii) result in a duration of the second TXOP on the second link to be within a duration of the first TXOP.

In some implementations, in obtaining the second TXOP on the second link, process 1500 may involve processor 1412 performing certain operations. For instance, process 1500 may involve processor 1412 detecting an intra-BSS TXOP of the other apparatus on the first link. Additionally, process 1500 may involve processor 1412 performing a backoff procedure to allow a backoff timer counting down to 0. Moreover, process 1500 may involve processor 1412 detecting virtual carrier sensing idle and ED-based CCA idle on the second link while waiting for the start of a transmission within the intra-BSS TXOP. In some implementations, in detecting the virtual carrier sensing idle and the ED-based CCA idle on the second link while waiting for the start of the transmission within the intra-BSS TXOP, process 1500 may involve processor 1412 detecting the virtual carrier sensing idle and the ED-based CCA idle on the second link during an interval of a waiting time or PIFS immediately preceding the second TXOP.

In some implementations, in obtaining the second TXOP on the second link, process 1500 may involve processor 1412 performing certain operations. For instance, process 1500 may involve processor 1412 detecting a transmission by the other apparatus on the first link. Moreover, process 1500 may involve processor 1412 performing either: (a) suspending a backoff procedure on the second link, or (b) detecting virtual carrier sensing idle and ED-based CCA idle on the second link during an interval of PIFS immediately preceding the second TXOP.

In some implementations, the apparatus may be implemented in an AP (e.g., AP 120) and the other apparatus may be implemented in a first STA (e.g., STA 110 or STA1). In such cases, in performing the one or more transmissions during the second TXOP on the second link such that the second TXOP is at least partially synchronized with the first TXOP (e.g., intra-BSS uplink TXOP) on the first link, process 1500 may involve processor 1412 performing certain operations. For instance, process 1500 may involve processor 1412 transmitting, on the first link, a first trigger along with an acknowledgement with respect to a first PPDU transmitted by the first STA. Additionally, process 1500 may involve processor 1412 transmitting, on the second link, a second trigger to trigger a second STA for an uplink transmission on the second link. In such cases, each of the first trigger and the second trigger may indicate a PPDU length for a next transmission by each of the first STA and the second STA.

In some implementations, the apparatus may be implemented in an AP (e.g., AP 120) and the other apparatus may be implemented in a first STA (e.g., STA 110 or STA1). In such cases, in performing the one or more transmissions during the second TXOP on the second link such that the second TXOP is at least partially synchronized with the first TXOP on the first link, process 1500 may involve processor 1412 performing certain operations. For instance, process 1500 may involve processor 1412 transmitting, on the first link or the second link, a short feedback instead of a normal BA in response to receiving a PPDU from the first STA on the first link or from the second STA on the second link.

In some implementations, the short feedback may include an NDP ACK having a PHY layer header without any MAC layer payload. In some implementations, the PHY header may contain information comprising an ID of a TXOP holder, an indication of ACK or delayed BA, a length of a next PPDU, or a combination thereof.

In some implementations, in performing the one or more transmissions during the second TXOP on the second link such that the second TXOP is at least partially synchronized with the first TXOP (e.g., intra-BSS uplink TXOP) on the first link, process 1500 may involve processor 1412 controlling a length of the one or more transmissions of the second TXOP to achieve either alignment of uplink transmission and downlink transmission on the first link and the second link or minimum overlapping of downlink and uplink transmission times within an overlap between the first TXOP and the second TXOP or ending points of the first TXOP and the second TXOP or an earlier ending point of the second TXOP.

In some implementations, in performing the one or more transmissions during the second TXOP on the second link such that the second TXOP is at least partially synchronized with the first TXOP (e.g., intra-BSS uplink TXOP) on the first link, process 1500 may involve processor 1412 performing certain operations. For instance, process 1500 may involve processor 1412 decoding a first PPDU (e.g., intra-BSS uplink PPDU) transmitted by the other apparatus on the first link to determine at least a length of the first PPDU (e.g., by decoding the PHY layer header), a BSS color, an uplink indication, and/or a TXOP duration. Additionally, process 1500 may involve processor 1412 controlling transmission of a second PPDU on the second link to align an ending time of the second PPDU (e.g., uplink PPDU) with an ending time of the first PPDU based on the length of the first PPDU.

In some implementations, in performing the one or more transmissions during the second TXOP (e.g., uplink TXOP) on the second link such that the second TXOP is at least partially synchronized with the first TXOP (e.g., intra-BSS uplink TXOP) on the first link, process 1500 may involve processor 1412 performing additional operations. For instance, process 1500 may involve processor 1412 receiving, from an AP (e.g., AP 120), a trigger along with an acknowledgement with respect to the second PPDU. Furthermore, process 1500 may involve processor 1412 transmitting, responsive to receiving the trigger, a fourth PPDU on the second link having a starting time and an ending time aligned with a starting time and an ending time of a third PPDU transmitted by the other apparatus on the first link.

In some implementations, the trigger may indicate a PPDU length for a next transmission by each of the apparatus and the other apparatus.

In some implementations, the apparatus may be implemented in a second STA (e.g., STA 115 or STA2) and the other apparatus may be implemented in a first STA (e.g., STA 110 or STA1). In such cases, in performing the one or more transmissions during the second TXOP (e.g., uplink TXOP) on the second link such that the second TXOP is at least partially synchronized with the first TXOP (e.g., intra-BSS uplink TXOP) on the first link, process 1500 may involve processor 1412 receiving a BA from an AP (e.g., AP 120) with respect to each uplink transmission on the second link while the first STA receives an NDP ACK with respect to each uplink transmission on the first link.

Figure 16:
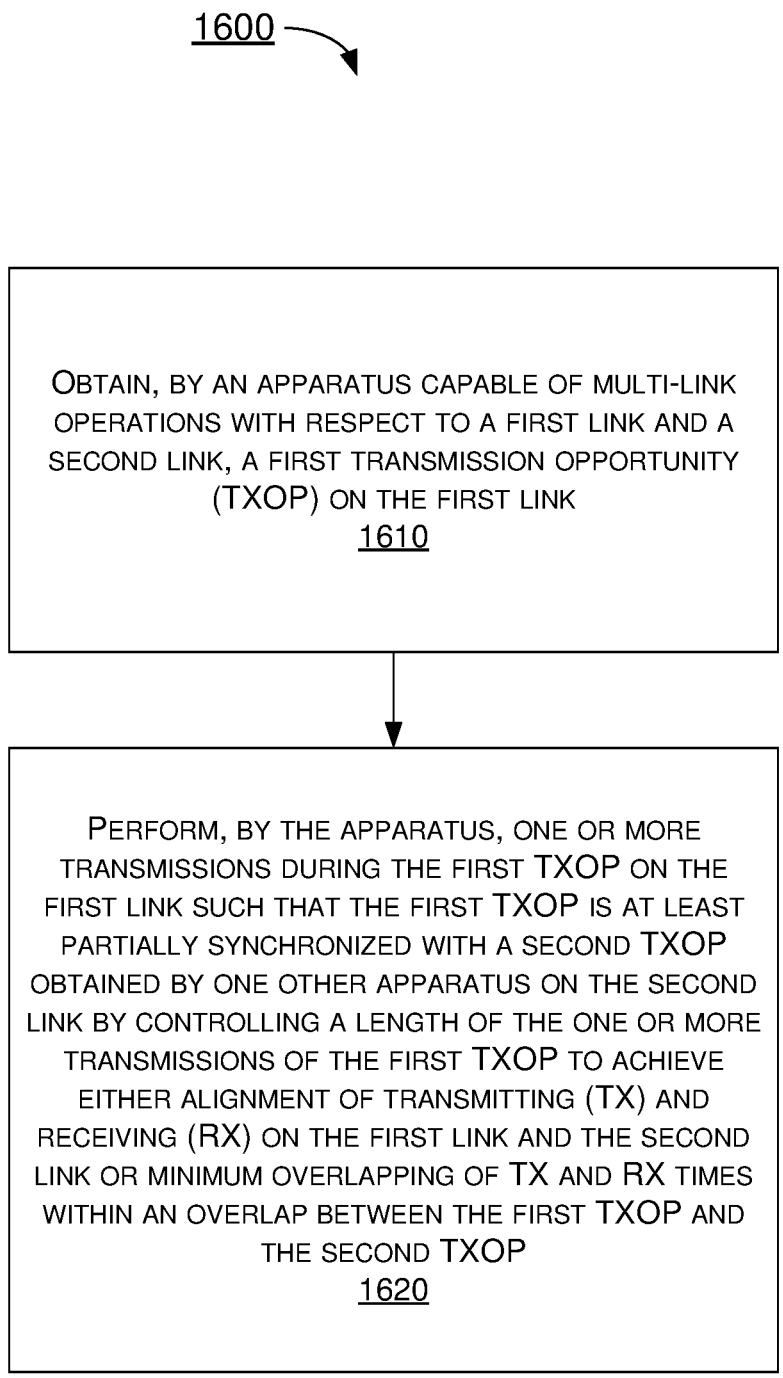
FIG. 16 is a flowchart of an example process in accordance with an implementation of the present disclosure.

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to multi-link channel access and operation with efficient utilization of multi-link resources in wireless communications in accordance with the present disclosure. Process 1600 may include one or more operations, actions, or functions as illustrated by one or more of blocks 1610 and 1620. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in apparatus 1410 and apparatus 1420 as well as any variations thereof. Solely for illustrative purposes and without limiting the scope, process 1600 is described below in the context of apparatus 1410 implemented in or as STA 110 (STA1) and apparatus 1420 implemented in or as AP 120 of a wireless network such as a WLAN in network environment 100 in accordance with one or more of IEEE 802.11 standards. Process 1600 may begin at block 1610.

At 1610, process 1600 may involve processor 1412 of apparatus 1410 capable of multi-link operations with respect to a first link and a second link obtaining, via transceiver 1416, a first TXOP on the first link. Process 1600 may proceed from 1610 to 1620.

At 1620, process 1600 may involve processor 1412 performing, via transceiver 1416, one or more transmissions during the first TXOP on the first link such that the first TXOP is at least partially synchronized with a second TXOP obtained by one other apparatus on the second link.

In some implementations, in obtaining the first TXOP on the first link, process 1600 may involve processor 1412 obtaining the first TXOP using contention-based channel access, virtual carrier sensing, ED-based CCA, or a combination thereof.

In some implementations, in performing the one or more transmissions during the first TXOP on the first link such that the first TXOP is at least partially synchronized with the second TXOP on the second link, process 1600 may involve processor 1412 receiving a short feedback instead of a normal BA as a response to one of the one or more transmissions, and wherein the short feedback is shorter than the normal BA.

In some implementations, the short feedback may include an NDP ACK having a PHY layer header without any MAC layer payload. In such cases, the PHY header may contain information comprising an ID of a TXOP holder, an indication of ACK or delayed BA, a length of a next PPDU, or a combination thereof.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   obtaining, by an apparatus capable of multi-link operations with respect to a first link and a second link, a second transmission opportunity (TXOP) on the second link after one other apparatus has started a first TXOP on the first link; and
   performing, by the apparatus, one or more transmissions during the second TXOP on the second link such that the second TXOP is at least partially synchronized with the first TXOP on the first link.

2. The method of claim 1, wherein the obtaining of the second TXOP on the second link comprises obtaining the second TXOP using contention-based channel access.

3. The method of claim 1, wherein the obtaining of the second TXOP on the second link comprises:
   detecting a transmission by the other apparatus on the first link; and
   obtaining the second TXOP using enhanced distributed channel access (EDCA) on the second link upon a backoff timer counting down to 0.

4. The method of claim 3, wherein the apparatus comprises a second station (STA) and the other apparatus comprises a first STA, and wherein the performing of the one or more transmissions during the second TXOP on the second link such that the second TXOP is at least partially synchronized with the first TXOP on the first link comprises:
   decoding a first Physical Layer Conformance Procedure (PLCP) Protocol Data Unit (PPDU) transmitted by the other apparatus on the first link to determine at least one of a length of the first PPDU, a basic service set (BSS) color, an uplink indication, and a TXOP duration;
   determining the first PPDU to be an intra-BSS PPDU;
   controlling transmission of a second PPDU on the second link to align an ending time of the second PPDU with an ending time of the first PPDU based on the length of the first PPDU; and
   receiving a trigger along with an acknowledgement with respect to the second PPDU,
   wherein the trigger triggers the second STA to perform an uplink transmission on the second link, and
   wherein the trigger indicates a PPDU length for a next transmission by each of the first STA and/or the second STA.

5. The method of claim 3, wherein the apparatus comprises a second station (STA) and the other apparatus comprises a first STA, and wherein the performing of the one or more transmissions during the second TXOP on the second link such that the second TXOP is at least partially synchronized with the first TXOP on the first link comprises:
- decoding a first Physical Layer Conformance Procedure (PLCP) Protocol Data Unit (PPDU) transmitted by the other apparatus on the first link to determine at least one of a length of the first PPDU, a basic service set (BSS) color, and a TXOP duration;
- determining the first TXOP to be an overlapping BSS (OBSS) TXOP;
- transmitting a request-to-send (RTS) frame to an associated AP;
- receiving a clear-to-send (CTS) frame from the associated AP in case of at least one of the following conditions: (i) detection of an OBSS TXOP on link 1 by a co-located multi-link AP, and (ii) the co-located multi-link AP not participating an ongoing TXOP on link 1, and
- controlling an ending time of a second TXOP on the second link to either align the ending time of the second TXOP on the second link with an ending time of the first TXOP on the first link or result in a duration of the second TXOP on the second link to be within a duration of the first TXOP or result in a duration of the second TXOP on the second link to be within a length of the first PPDU.

6. The method of claim 1, wherein the obtaining of the second TXOP on the second link comprises:
- detecting an intra-BSS TXOP of the other apparatus on the first link;
- performing a backoff procedure to allow a backoff timer counting down to 0; and
- detecting virtual carrier sensing idle and energy detection (ED)-based clear channel assessment (CCA) idle on the second link while waiting for a start of an uplink transmission within the intra-BSS TXOP.

7. The method of claim 6, wherein the detecting of the virtual carrier sensing idle and the ED-based CCA idle on the second link while waiting for the start of the transmission within the intra-BSS TXOP comprises:
- detecting the virtual carrier sensing idle and the ED-based CCA idle on the second link during an interval of a waiting time or point coordination function (PCF) inter-frame space (PIFS) immediately preceding the second TXOP.

8. The method of claim 1, wherein the obtaining of the second TXOP on the second link comprises:
- detecting a transmission by the other apparatus on the first link; and
- performing either or both of:
  - suspending a backoff procedure on the second link; and
  - detecting virtual carrier sensing idle and energy detection (ED)-based clear channel assessment (CCA) idle on the second link during an interval of a waiting time or point coordination function (PCF) inter-frame space (PIFS) immediately preceding the second TXOP.

9. The method of claim 1, wherein the apparatus comprises an access point (AP) and the other apparatus comprises a first station (STA), and wherein the performing of the one or more transmissions during the second TXOP on the second link such that the second TXOP is at least partially synchronized with the first TXOP on the first link comprises:
- transmitting, on the first link, a first trigger along with an acknowledgement with respect to a first Physical Layer Conformance Procedure (PLCP) Protocol Data Unit (PPDU) transmitted by the first STA; and
- transmitting, on the second link, a second trigger to trigger a second STA for an uplink transmission on the second link,
- wherein each of the first trigger and the second trigger indicates a PPDU length for a next transmission by each of the first STA and the second STA.

10. The method of claim 1, wherein the apparatus comprises an access point (AP) and the other apparatus comprises a first station (STA), and wherein the performing of the one or more transmissions during the second TXOP on the second link such that the second TXOP is at least partially synchronized with the first TXOP on the first link comprises transmitting, on the first link or the second link, a short feedback instead of a normal block acknowledgement (BA) in response to receiving a Physical Layer Conformance Procedure (PLCP) Protocol Data Unit (PPDU) from the first STA on the first link or from a second STA on the second link.

11. The method of claim 10, wherein the short feedback comprises a null data packet (NDP) acknowledgement (ACK) having a physical (PHY) layer header without any medium access control (MAC) layer payload, and wherein the PHY header contains information comprising an identification (ID) of a TXOP holder, an indication of ACK or delayed BA, a length of a next PPDU, or a combination thereof.

12. The method of claim 1, wherein the performing of the one or more transmissions during the second TXOP on the second link such that the second TXOP is at least partially synchronized with the first TXOP on the first link comprises controlling a length of the one or more transmissions of the second TXOP to achieve either alignment of uplink transmitting (TX) and downlink transmitting on the first link and the second link or minimum overlapping of downlink and uplink transmission times within an overlap between the first TXOP and the second TXOP or ending points of the first TXOP and the second TXOP or an earlier ending point of the second TXOP.

13. The method of claim 1, wherein the performing of the one or more transmissions during the second TXOP on the second link such that the second TXOP is at least partially synchronized with the first TXOP on the first link comprises:
- decoding a first Physical Layer Conformance Procedure (PLCP) Protocol Data Unit (PPDU) transmitted by the other apparatus on the first link to determine at least one of a length of the first PPDU, a basic service set (BSS) color, an uplink indication, and a TXOP duration; and
- controlling transmission of a second PPDU on the second link to align an ending time of the second PPDU with an ending time of the first PPDU based on the length of the first PPDU.

14. The method of claim 13, wherein the performing of the one or more transmissions during the second TXOP on the second link such that the second TXOP is at least partially synchronized with the first TXOP on the first link further comprises:
- receiving, from an access point (AP), a trigger along with an acknowledgement with respect to the second PPDU; and
- transmitting, responsive to receiving the trigger, a fourth PPDU on the second link having a starting time and an ending time aligned with a starting time and an ending time of a third PPDU transmitted by the other apparatus on the first link.

15. The method of claim 14, wherein the trigger indicates a PPDU length for a next transmission by each of the apparatus and the other apparatus.

16. The method of claim 1, wherein the apparatus comprises a second station (STA) and the other apparatus comprises a first STA, wherein the performing of the one or more transmissions during the second TXOP on the second link such that the second TXOP is at least partially synchronized with the first TXOP on the first link comprises receiving a block acknowledgement (BA) from an access point (AP) with respect to each uplink transmission on the second link while the first STA receives a null data packet (NDP) acknowledgement (ACK) with respect to each uplink transmission on the first link.

17. A method, comprising:
- obtaining, by an apparatus capable of multi-link operations with respect to a first link and a second link, a first transmission opportunity (TXOP) on the first link; and
- performing, by the apparatus, one or more transmissions during the first TXOP on the first link such that the first TXOP is at least partially synchronized with a second TXOP obtained by one other apparatus on the second link.

18. The method of claim 17, wherein the obtaining of the first TXOP on the first link comprises obtaining the first TXOP using contention-based channel access, virtual carrier sensing, energy detection (ED)-based clear channel assessment (CCA), or a combination thereof.

19. The method of claim 17, wherein the performing of the one or more transmissions during the first TXOP on the first link such that the first TXOP is at least partially synchronized with the second TXOP on the second link comprises receiving a short feedback instead of a normal block acknowledgement (BA) as a response to one of the one or more transmissions, and wherein the short feedback is shorter than the normal BA.

20. The method of claim 19, wherein the short feedback comprises a null data packet (NDP) acknowledgement (ACK) having a physical (PHY) layer header without any medium access control (MAC) layer payload, and wherein the PHY header contains information comprising an identification (ID) of a TXOP holder, an indication of ACK or delayed BA, a length of a next Physical Layer Conformance Procedure (PLCP) Protocol Data Unit (PPDU), or a combination thereof.

\* \* \* \* \*